(12) United States Patent
Fukuda

(10) Patent No.: US 12,344,040 B2
(45) Date of Patent: Jul. 1, 2025

(54) PNEUMATIC TIRE

(71) Applicant: The Yokohama Rubber Co., LTD., Tokyo (JP)

(72) Inventor: Mina Fukuda, Hiratsuka (JP)

(73) Assignee: The Yokohama Rubber Co., LTD., Tokyo (JP)

(*) Notice: Subject to any disclaimer, the term of this patent is extended or adjusted under 35 U.S.C. 154(b) by 493 days.

(21) Appl. No.: 16/962,804

(22) PCT Filed: Nov. 30, 2018

(86) PCT No.: PCT/JP2018/044166
§ 371 (c)(1),
(2) Date: Jul. 16, 2020

(87) PCT Pub. No.: WO2019/142509
PCT Pub. Date: Jul. 25, 2019

(65) Prior Publication Data
US 2021/0370723 A1 Dec. 2, 2021

(30) Foreign Application Priority Data
Jan. 18, 2018 (JP) .................. 2018-006613

(51) Int. Cl.
*B60C 11/03* (2006.01)
*B60C 9/20* (2006.01)
(Continued)

(52) U.S. Cl.
CPC ............ *B60C 11/0309* (2013.01); *B60C 9/20* (2013.01); *B60C 11/11* (2013.01);
(Continued)

(58) Field of Classification Search
CPC . B60C 11/0309; B60C 11/11; B60C 11/1204; B60C 11/1236; B60C 11/1259;
(Continued)

(56) References Cited

U.S. PATENT DOCUMENTS 9,108,472 B2 8/2015 Hamanaka
10,071,602 B2 9/2018 Motomitsu et al.
(Continued)

FOREIGN PATENT DOCUMENTS

CN 101585297 11/2009
CN 103826874 5/2014
(Continued)

OTHER PUBLICATIONS

International Search Report for International Application No. PCT/JP2018/044166 dated Mar. 5, 2019, 4 pages, Japan.

*Primary Examiner* — Justin R Fischer
*Assistant Examiner* — Philip N Schwartz
(74) *Attorney, Agent, or Firm* — Thorpe North & Western

(57) ABSTRACT

A pneumatic tire includes two circumferential main grooves disposed in an inner half of a tread developed width in a tire lateral direction; shoulder lug grooves that divide shoulder land portions into shoulder block portions and that each include a see-through portion in the tire lateral direction; and center lug grooves that divide a center land portion into a plurality of center block portions. The center lug grooves each include: two end groove portions opening to the innermost circumferential main grooves and one center groove portion that extends between the end groove portions, has at least a part disposed on a tire equator line, and has an angle $\theta_1$ with respect to the tire equator line satisfying $-45° \leq \theta_1 \leq +15°$.

15 Claims, 17 Drawing Sheets

(51) Int. Cl.
  *B60C 11/11*   (2006.01)
  *B60C 11/12*   (2006.01)
(52) U.S. Cl.
  CPC ...... *B60C 11/1204* (2013.01); *B60C 11/1236* (2013.01); *B60C 11/1259* (2013.01); *B60C 2011/0348* (2013.01); *B60C 2011/0353* (2013.01); *B60C 2011/0355* (2013.01); *B60C 2011/0365* (2013.01); *B60C 2011/0367* (2013.01); *B60C 2011/0369* (2013.01); *B60C 2011/0372* (2013.01); *B60C 2011/1254* (2013.01)
(58) Field of Classification Search
  CPC ..... B60C 2011/0353; B60C 2011/0355; B60C 2011/1254; B60C 2011/0367; B60C 2011/0365; B60C 2011/0372; B60C 2011/0369; B60C 2011/0348; B60C 9/20; B60C 11/1369
  See application file for complete search history.

(56) References Cited

U.S. PATENT DOCUMENTS

| | | | |
|---|---|---|---|
| 10,744,823 | B2 | 8/2020 | Fujimoto |
| 2004/0154716 | A1* | 8/2004 | Kimishima ............. B60C 11/11 |
| | | | 152/209.25 |
| 2008/0078488 | A1 | 4/2008 | Yoda |
| 2009/0199943 | A1 | 8/2009 | Boiocchi et al. |
| 2010/0294409 | A1* | 11/2010 | Bolzoni ............. B60C 11/1263 |
| | | | 152/209.18 |
| 2012/0145295 | A1* | 6/2012 | Yamada ................. B60C 11/12 |
| | | | 152/209.1 |
| 2013/0153103 | A1* | 6/2013 | Aoki ....................... B60C 11/13 |
| | | | 152/209.16 |
| 2015/0273949 | A1 | 10/2015 | Arai |
| 2017/0057296 | A1* | 3/2017 | Takemori ............... B60C 11/01 |
| 2017/0210180 | A1 | 7/2017 | Sato et al. |
| 2019/0111737 | A1 | 4/2019 | Motomitsu et al. |

FOREIGN PATENT DOCUMENTS

| | | | |
|---|---|---|---|
| CN | 104129236 | 11/2014 | |
| CN | 104943478 | 9/2015 | |
| CN | 106457916 | 2/2017 | |
| CN | 106536220 | 3/2017 | |
| CN | 106536225 | 3/2017 | |
| JP | H04228308 A * | 8/1992 | ............. B60C 11/11 |
| JP | H0577609 A * | 3/1993 | ......... B60C 11/0083 |
| JP | H05-162511 | 6/1993 | |
| JP | 2006-151083 | 6/2006 | |
| JP | 2011-251685 | 12/2011 | |
| JP | 2014-213832 | 11/2014 | |
| JP | 2015-229395 | 12/2015 | |
| JP | 2017-178237 | 10/2017 | |
| JP | 2018-001804 | 1/2018 | |
| WO | WO 2006/056238 | 6/2006 | |
| WO | WO 2006/057169 | 6/2006 | |
| WO | WO 2013/042257 | 3/2013 | |
| WO | WO-2014073285 A1 * | 5/2014 | ......... B60C 11/0306 |
| WO | WO 2015/166802 | 11/2015 | |
| WO | WO 2016/013604 | 1/2016 | |
| WO | WO 2016/013605 | 1/2016 | |
| WO | WO 2017/170562 | 10/2017 | |

* cited by examiner

FIG. 2

|  | Conventional Example | Comparative Example 1 | Comparative Example 2 |
|---|---|---|---|
| Arrangement of two circumferential main grooves (Inner half or outer half of tread developed width in tire lateral direction) | Inner side | Outer side | Inner side |
| Communication of shoulder lug grooves to circumferential main grooves | Yes | No | Yes |
| Presence of see-through portions of shoulder lug grooves | Yes | No | Yes |
| Presence of center lug grooves | Yes | No | Yes |
| Opening of center lug grooves in circumferential main grooves | Yes | - | Yes |
| Presence of center groove portions (absence: linear center lug grooves) | Yes | - | No |
| Angle $\theta_1$ of center groove portion [°] | 45 | - | - |
| Presence of connection groove portions | No | - | No |
| $D_2/D_1$ | 0.9 | - | - |
| $D_3/D_1$ | 0.8 | - | - |
| $W_2/W_1$ | 0.2 | - | - |
| $W_3/W_1$ | 0.2 | - | - |
| Number of center sipes outward of tire equator line | 0 | 0 | 0 |
| Presence of opening at ends of center sipes | - | - | - |
| Crossing points of center sipes and tire equator line | - | - | - |
| Presence of bent portions of center sipes | - | - | - |
| $\theta_2$ [°] | - | - | - |
| $D_4/D_1$ | - | - | - |
| Presence of shoulder circumferential narrow grooves | No | No | No |
| Presence of bent portions of shoulder circumferential narrow grooves | - | - | - |
| $D_5/D_1$ | - | - | - |
| $W_4$ [mm] | - | - | - |
| $W_5/W_6$ | 0.3 | 0.3 | 0.3 |
| $D_6/D_1$ | 0.3 | 0.3 | 0.3 |
| $W_7/W_6$ | 0.1 | 0.1 | 0.1 |
| $W_9/W_8$ | 0.8 | 0.8 | 0.8 |
| $W_8/W_{10}$ | 0.1 | 0.1 | 0.1 |
| Heel and toe wear resistance performance | 100 | 90 | 95 |
| Traction performance on wet road surfaces | 100 | 90 | 100 |

FIG. 5A

|  | Example 1 | Example 2 | Example 3 | Example 4 |
|---|---|---|---|---|
| Arrangement of two circumferential main grooves (Inner half or outer half of tread developed width in tire lateral direction) | Inner side | Inner side | Inner side | Inner side |
| Communication of shoulder lug grooves to circumferential main grooves | Yes | Yes | Yes | Yes |
| Presence of see-through portions of shoulder lug grooves | Yes | Yes | Yes | Yes |
| Presence of center lug grooves | Yes | Yes | Yes | Yes |
| Opening of center lug grooves in circumferential main grooves | Yes | Yes | Yes | Yes |
| Presence of center groove portions (absence: linear center lug grooves) | Yes | Yes | Yes | Yes |
| Angle $\theta_1$ of center groove portion [°] | 0 | 4 | 15 | 4 |
| Presence of connection groove portions | No | No | No | Yes |
| $D_2/D_1$ | 0.9 | 0.9 | 0.9 | 0.9 |
| $D_3/D_1$ | 0.8 | 0.8 | 0.8 | 0.8 |
| $W_2/W_1$ | 0.2 | 0.2 | 0.2 | 0.2 |
| $W_3/W_1$ | 0.2 | 0.2 | 0.2 | 0.2 |
| Number of center sipes outward of tire equator line | 0 | 0 | 0 | 0 |
| Presence of opening at ends of center sipes | - | - | - | - |
| Crossing points of center sipes and tire equator line | - | - | - | - |
| Presence of bent portions of center sipes | - | - | - | - |
| $\theta_2$ [°] | - | - | - | - |
| $D_4/D_1$ | - | - | - | - |
| Presence of shoulder circumferential narrow grooves | No | No | No | No |
| Presence of bent portions of shoulder circumferential narrow grooves | - | - | - | - |
| $D_5/D_1$ | - | - | - | - |
| $W_4$ [mm] | - | - | - | - |
| $W_5/W_6$ | 0.3 | 0.3 | 0.3 | 0.3 |
| $D_6/D_1$ | 0.3 | 0.3 | 0.3 | 0.3 |
| $W_1/W_6$ | 0.1 | 0.1 | 0.1 | 0.1 |
| $W_9/W_8$ | 0.8 | 0.8 | 0.8 | 0.8 |
| $W_8/W_{10}$ | 0.1 | 0.1 | 0.1 | 0.1 |
| Heel and toe wear resistance performance | 103 | 103 | 101 | 104 |
| Traction performance on wet road surfaces | 101 | 102 | 103 | 102 |

FIG. 5B

|  | Example 5 | Example 6 | Example 7 | Example 8 |
|---|---|---|---|---|
| Arrangement of two circumferential main grooves (Inner half or outer half of tread developed width in tire lateral direction) | Inner side | Inner side | Inner side | Inner side |
| Communication of shoulder lug grooves to circumferential main grooves | Yes | Yes | Yes | Yes |
| Presence of see-through portions of shoulder lug grooves | Yes | Yes | Yes | Yes |
| Presence of center lug grooves | Yes | Yes | Yes | Yes |
| Opening of center lug grooves in circumferential main grooves | Yes | Yes | Yes | Yes |
| Presence of center groove portions (absence: linear center lug grooves) | Yes | Yes | Yes | Yes |
| Angle $\theta_1$ of center groove portion [°] | 4 | 4 | 4 | 4 |
| Presence of connection groove portions | Yes | Yes | Yes | Yes |
| $D_2/D_1$ | 0.5 | 0.7 | 0.8 | 0.7 |
| $D_3/D_1$ | 0.8 | 0.8 | 0.8 | 0.2 |
| $W_2/W_1$ | 0.2 | 0.2 | 0.2 | 0.2 |
| $W_3/W_1$ | 0.2 | 0.2 | 0.2 | 0.2 |
| Number of center sipes outward of tire equator line | 0 | 0 | 0 | 0 |
| Presence of opening at ends of center sipes | - | - | - | - |
| Crossing points of center sipes and tire equator line | - | - | - | - |
| Presence of bent portions of center sipes | - | - | - | - |
| $\theta_2$ [°] | - | - | - | - |
| $D_4/D_1$ | - | - | - | - |
| Presence of shoulder circumferential narrow grooves | No | No | No | No |
| Presence of bent portions of shoulder circumferential narrow grooves | - | - | - | - |
| $D_5/D_1$ | - | - | - | - |
| $W_4$ [mm] | - | - | - | - |
| $W_5/W_6$ | 0.3 | 0.3 | 0.3 | 0.3 |
| $D_6/D_1$ | 0.3 | 0.3 | 0.3 | 0.3 |
| $W_1/W_6$ | 0.1 | 0.1 | 0.1 | 0.1 |
| $W_9/W_8$ | 0.8 | 0.8 | 0.8 | 0.8 |
| $W_8/W_{10}$ | 0.1 | 0.1 | 0.1 | 0.1 |
| Heel and toe wear resistance performance | 107 | 106 | 104 | 109 |
| Traction performance on wet road surfaces | 101 | 103 | 104 | 102 |

FIG. 5C

|  | Example 9 | Example 10 | Example 11 | Example 12 |
|---|---|---|---|---|
| Arrangement of two circumferential main grooves (Inner half or outer half of tread developed width in tire lateral direction) | Inner side | Inner side | Inner side | Inner side |
| Communication of shoulder lug grooves to circumferential main grooves | Yes | Yes | Yes | Yes |
| Presence of see-through portions of shoulder lug grooves | Yes | Yes | Yes | Yes |
| Presence of center lug grooves | Yes | Yes | Yes | Yes |
| Opening of center lug grooves in circumferential main grooves | Yes | Yes | Yes | Yes |
| Presence of center groove portions (absence: linear center lug grooves) | Yes | Yes | Yes | Yes |
| Angle $\theta_1$ of center groove portion [°] | 4 | 4 | 4 | 4 |
| Presence of connection groove portions | Yes | Yes | Yes | Yes |
| $D_2/D_1$ | 0.7 | 0.7 | 0.7 | 0.7 |
| $D_3/D_1$ | 0.5 | 0.7 | 0.5 | 0.5 |
| $W_2/W_1$ | 0.2 | 0.2 | 0.3 | 0.6 |
| $W_3/W_1$ | 0.2 | 0.2 | 0.2 | 0.2 |
| Number of center sipes outward of tire equator line | 0 | 0 | 0 | 0 |
| Presence of opening at ends of center sipes | - | - | - | - |
| Crossing points of center sipes and tire equator line | - | - | - | - |
| Presence of bent portions of center sipes | - | - | - | - |
| $\theta_2$ [°] | - | - | - | - |
| $D_4/D_1$ | - | - | - | - |
| Presence of shoulder circumferential narrow grooves | No | No | No | No |
| Presence of bent portions of shoulder circumferential narrow grooves | - | - | - | - |
| $D_5/D_1$ | - | - | - | - |
| $W_4$ [mm] | - | - | - | - |
| $W_5/W_6$ | 0.3 | 0.3 | 0.3 | 0.3 |
| $D_6/D_1$ | 0.3 | 0.3 | 0.3 | 0.3 |
| $W_1/W_6$ | 0.1 | 0.1 | 0.1 | 0.1 |
| $W_9/W_8$ | 0.8 | 0.8 | 0.8 | 0.8 |
| $W_8/W_{10}$ | 0.1 | 0.1 | 0.1 | 0.1 |
| Heel and toe wear resistance performance | 108 | 106 | 107 | 106 |
| Traction performance on wet road surfaces | 104 | 105 | 105 | 107 |

FIG. 5D

|  | Example 13 | Example 14 | Example 15 | Example 16 |
|---|---|---|---|---|
| Arrangement of two circumferential main grooves (Inner half or outer half of tread developed width in tire lateral direction) | Inner side | Inner side | Inner side | Inner side |
| Communication of shoulder lug grooves to circumferential main grooves | Yes | Yes | Yes | Yes |
| Presence of see-through portions of shoulder lug grooves | Yes | Yes | Yes | Yes |
| Presence of center lug grooves | Yes | Yes | Yes | Yes |
| Opening of center lug grooves in circumferential main grooves | Yes | Yes | Yes | Yes |
| Presence of center groove portions (absence: linear center lug grooves) | Yes | Yes | Yes | Yes |
| Angle $\theta_1$ of center groove portion [°] | 4 | 4 | 4 | 4 |
| Presence of connection groove portions | Yes | Yes | Yes | Yes |
| $D_2/D_1$ | 0.7 | 0.7 | 0.7 | 0.7 |
| $D_3/D_1$ | 0.5 | 0.5 | 0.5 | 0.5 |
| $W_2/W_1$ | 0.8 | 0.6 | 0.6 | 0.6 |
| $W_3/W_1$ | 0.2 | 0.3 | 0.6 | 0.8 |
| Number of center sipes outward of tire equator line | 0 | 0 | 0 | 0 |
| Presence of opening at ends of center sipes | - | - | - | - |
| Crossing points of center sipes and tire equator line | - | - | - | - |
| Presence of bent portions of center sipes | - | - | - | - |
| $\theta_2$ [°] | - | - | - | - |
| $D_4/D_1$ | - | - | - | - |
| Presence of shoulder circumferential narrow grooves | No | No | No | No |
| Presence of bent portions of shoulder circumferential narrow grooves | - | - | - | - |
| $D_5/D_1$ | - | - | - | - |
| $W_4$ [mm] | - | - | - | - |
| $W_5/W_6$ | 0.3 | 0.3 | 0.3 | 0.3 |
| $D_6/D_1$ | 0.3 | 0.3 | 0.3 | 0.3 |
| $W_1/W_6$ | 0.1 | 0.1 | 0.1 | 0.1 |
| $W_9/W_8$ | 0.8 | 0.8 | 0.8 | 0.8 |
| $W_8/W_{10}$ | 0.1 | 0.1 | 0.1 | 0.1 |
| Heel and toe wear resistance performance | 103 | 105 | 104 | 101 |
| Traction performance on wet road surfaces | 109 | 109 | 111 | 113 |

FIG. 6A

|  | Example 17 | Example 18 | Example 19 | Example 20 |
|---|---|---|---|---|
| Arrangement of two circumferential main grooves (Inner half or outer half of tread developed width in tire lateral direction) | Inner side | Inner side | Inner side | Inner side |
| Communication of shoulder lug grooves to circumferential main grooves | Yes | Yes | Yes | Yes |
| Presence of see-through portions of shoulder lug grooves | Yes | Yes | Yes | Yes |
| Presence of center lug grooves | Yes | Yes | Yes | Yes |
| Opening of center lug grooves in circumferential main grooves | Yes | Yes | Yes | Yes |
| Presence of center groove portions (absence: linear center lug grooves) | Yes | Yes | Yes | Yes |
| Angle $\theta_1$ of center groove portion [°] | 4 | 4 | 4 | 4 |
| Presence of connection groove portions | Yes | Yes | Yes | Yes |
| $D_2/D_1$ | 0.7 | 0.7 | 0.7 | 0.7 |
| $D_3/D_1$ | 0.5 | 0.5 | 0.5 | 0.5 |
| $W_2/W_1$ | 0.6 | 0.6 | 0.6 | 0.6 |
| $W_3/W_1$ | 0.6 | 0.6 | 0.6 | 0.6 |
| Number of center sipes outward of tire equator line | 1 | 2 | 1 | 1 |
| Presence of opening at ends of center sipes | Yes | Yes | No | No |
| Crossing points of center sipes and tire equator line | Yes | Yes | Yes | No |
| Presence of bent portions of center sipes | No | No | No | No |
| $\theta_2$ [°] | - | - | - | - |
| $D_4/D_1$ | 0.2 | 0.2 | 0.2 | 0.2 |
| Presence of shoulder circumferential narrow grooves | No | No | No | No |
| Presence of bent portions of shoulder circumferential narrow grooves | - | - | - | - |
| $D_5/D_1$ | - | - | - | - |
| $W_4$ [mm] | - | - | - | - |
| $W_5/W_6$ | 0.3 | 0.3 | 0.3 | 0.3 |
| $D_6/D_1$ | 0.3 | 0.3 | 0.3 | 0.3 |
| $W_1/W_6$ | 0.1 | 0.1 | 0.1 | 0.1 |
| $W_9/W_8$ | 0.8 | 0.8 | 0.8 | 0.8 |
| $W_8/W_{10}$ | 0.1 | 0.1 | 0.1 | 0.1 |
| Heel and toe wear resistance performance | 106 | 105 | 107 | 108 |
| Traction performance on wet road surfaces | 111 | 111 | 111 | 111 |

FIG. 6B

|  | Example 21 | Example 22 | Example 23 | Example 24 |
|---|---|---|---|---|
| Arrangement of two circumferential main grooves (Inner half or outer half of tread developed width in tire lateral direction) | Inner side | Inner side | Inner side | Inner side |
| Communication of shoulder lug grooves to circumferential main grooves | Yes | Yes | Yes | Yes |
| Presence of see-through portions of shoulder lug grooves | Yes | Yes | Yes | Yes |
| Presence of center lug grooves | Yes | Yes | Yes | Yes |
| Opening of center lug grooves in circumferential main grooves | Yes | Yes | Yes | Yes |
| Presence of center groove portions (absence: linear center lug grooves) | Yes | Yes | Yes | Yes |
| Angle $\theta_1$ of center groove portion [°] | 4 | 4 | 4 | 4 |
| Presence of connection groove portions | Yes | Yes | Yes | Yes |
| $D_2/D_1$ | 0.7 | 0.7 | 0.7 | 0.7 |
| $D_3/D_1$ | 0.5 | 0.5 | 0.5 | 0.5 |
| $W_2/W_1$ | 0.6 | 0.6 | 0.6 | 0.6 |
| $W_3/W_1$ | 0.6 | 0.6 | 0.6 | 0.6 |
| Number of center sipes outward of tire equator line | 1 | 1 | 1 | 1 |
| Presence of opening at ends of center sipes | No | No | No | No |
| Crossing points of center sipes and tire equator line | No | No | No | No |
| Presence of bent portions of center sipes | Yes | Yes | Yes | Yes |
| $\theta_2$ [°] | 20 | 0 | 4 | 15 |
| $D_4/D_1$ | 0.2 | 0.2 | 0.2 | 0.2 |
| Presence of shoulder circumferential narrow grooves | No | No | No | No |
| Presence of bent portions of shoulder circumferential narrow grooves | - | - | - | - |
| $D_5/D_1$ | - | - | - | - |
| $W_4$ [mm] | - | - | - | - |
| $W_5/W_6$ | 0.3 | 0.3 | 0.3 | 0.3 |
| $D_6/D_1$ | 0.3 | 0.3 | 0.3 | 0.3 |
| $W_1/W_6$ | 0.1 | 0.1 | 0.1 | 0.1 |
| $W_9/W_8$ | 0.8 | 0.8 | 0.8 | 0.8 |
| $W_8/W_{10}$ | 0.1 | 0.1 | 0.1 | 0.1 |
| Heel and toe wear resistance performance | 109 | 115 | 114 | 112 |
| Traction performance on wet road surfaces | 112 | 109 | 111 | 112 |

FIG. 6C

|  | Example 25 | Example 26 | Example 27 | Example 28 |
|---|---|---|---|---|
| Arrangement of two circumferential main grooves (Inner half or outer half of tread developed width in tire lateral direction) | Inner side | Inner side | Inner side | Inner side |
| Communication of shoulder lug grooves to circumferential main grooves | Yes | Yes | Yes | Yes |
| Presence of see-through portions of shoulder lug grooves | Yes | Yes | Yes | Yes |
| Presence of center lug grooves | Yes | Yes | Yes | Yes |
| Opening of center lug grooves in circumferential main grooves | Yes | Yes | Yes | Yes |
| Presence of center groove portions (absence: linear center lug grooves) | Yes | Yes | Yes | Yes |
| Angle $\theta_1$ of center groove portion [°] | 4 | 4 | 4 | 4 |
| Presence of connection groove portions | Yes | Yes | Yes | Yes |
| $D_2/D_1$ | 0.7 | 0.7 | 0.7 | 0.7 |
| $D_3/D_1$ | 0.5 | 0.5 | 0.5 | 0.5 |
| $W_2/W_1$ | 0.6 | 0.6 | 0.6 | 0.6 |
| $W_3/W_1$ | 0.6 | 0.6 | 0.6 | 0.6 |
| Number of center sipes outward of tire equator line | 1 | 1 | 1 | 1 |
| Presence of opening at ends of center sipes | No | No | No | No |
| Crossing points of center sipes and tire equator line | No | No | No | No |
| Presence of bent portions of center sipes | Yes | Yes | Yes | Yes |
| $\theta_2$ [°] | 4 | 4 | 4 | 4 |
| $D_4/D_1$ | 0.3 | 0.6 | 0.9 | 0.6 |
| Presence of shoulder circumferential narrow grooves | No | No | No | Yes |
| Presence of bent portions of shoulder circumferential narrow grooves | - | - | - | No |
| $D_5/D_1$ | - | - | - | 0.4 |
| $W_4$ [mm] | - | - | - | 6 |
| $W_5/W_6$ | 0.3 | 0.3 | 0.3 | 0.3 |
| $D_6/D_1$ | 0.3 | 0.3 | 0.3 | 0.3 |
| $W_1/W_6$ | 0.1 | 0.1 | 0.1 | 0.1 |
| $W_9/W_8$ | 0.8 | 0.8 | 0.8 | 0.8 |
| $W_8/W_{10}$ | 0.1 | 0.1 | 0.1 | 0.1 |
| Heel and toe wear resistance performance | 115 | 117 | 116 | 118 |
| Traction performance on wet road surfaces | 111 | 111 | 111 | 111 |

FIG. 7A

|  | Example 29 | Example 30 | Example 31 | Example 32 |
|---|---|---|---|---|
| Arrangement of two circumferential main grooves (Inner half or outer half of tread developed width in tire lateral direction) | Inner side | Inner side | Inner side | Inner side |
| Communication of shoulder lug grooves to circumferential main grooves | Yes | Yes | Yes | Yes |
| Presence of see-through portions of shoulder lug grooves | Yes | Yes | Yes | Yes |
| Presence of center lug grooves | Yes | Yes | Yes | Yes |
| Opening of center lug grooves in circumferential main grooves | Yes | Yes | Yes | Yes |
| Presence of center groove portions (absence: linear center lug grooves) | Yes | Yes | Yes | Yes |
| Angle $\theta_1$ of center groove portion [°] | 4 | 4 | 4 | 4 |
| Presence of connection groove portions | Yes | Yes | Yes | Yes |
| $D_2/D_1$ | 0.7 | 0.7 | 0.7 | 0.7 |
| $D_3/D_1$ | 0.5 | 0.5 | 0.5 | 0.5 |
| $W_2/W_1$ | 0.6 | 0.6 | 0.6 | 0.6 |
| $W_3/W_1$ | 0.6 | 0.6 | 0.6 | 0.6 |
| Number of center sipes outward of tire equator line | 1 | 1 | 1 | 1 |
| Presence of opening at ends of center sipes | No | No | No | No |
| Crossing points of center sipes and tire equator line | No | No | No | No |
| Presence of bent portions of center sipes | Yes | Yes | Yes | Yes |
| $\theta_2$ [°] | 4 | 4 | 4 | 4 |
| $D_4/D_1$ | 0.6 | 0.6 | 0.6 | 0.6 |
| Presence of shoulder circumferential narrow grooves | Yes | Yes | Yes | Yes |
| Presence of bent portions of shoulder circumferential narrow grooves | Yes | Yes | Yes | Yes |
| $D_5/D_1$ | 0.4 | 0.6 | 0.8 | 0.9 |
| $W_4$ [mm] | 6 | 6 | 6 | 6 |
| $W_5/W_6$ | 0.3 | 0.3 | 0.3 | 0.3 |
| $D_6/D_1$ | 0.3 | 0.3 | 0.3 | 0.3 |
| $W_1/W_6$ | 0.1 | 0.1 | 0.1 | 0.1 |
| $W_9/W_8$ | 0.8 | 0.8 | 0.8 | 0.8 |
| $W_8/W_{10}$ | 0.1 | 0.1 | 0.1 | 0.1 |
| Heel and toe wear resistance performance | 118 | 119 | 120 | 118 |
| Traction performance on wet road surfaces | 114 | 115 | 117 | 118 |

FIG. 7B

|  | Example 33 | Example 34 | Example 35 | Example 36 |
|---|---|---|---|---|
| Arrangement of two circumferential main grooves (Inner half or outer half of tread developed width in tire lateral direction) | Inner side | Inner side | Inner side | Inner side |
| Communication of shoulder lug grooves to circumferential main grooves | Yes | Yes | Yes | Yes |
| Presence of see-through portions of shoulder lug grooves | Yes | Yes | Yes | Yes |
| Presence of center lug grooves | Yes | Yes | Yes | Yes |
| Opening of center lug grooves in circumferential main grooves | Yes | Yes | Yes | Yes |
| Presence of center groove portions (absence: linear center lug grooves) | Yes | Yes | Yes | Yes |
| Angle $\theta_1$ of center groove portion [°] | 4 | 4 | 4 | 4 |
| Presence of connection groove portions | Yes | Yes | Yes | Yes |
| $D_2/D_1$ | 0.7 | 0.7 | 0.7 | 0.7 |
| $D_3/D_1$ | 0.5 | 0.5 | 0.5 | 0.5 |
| $W_2/W_1$ | 0.6 | 0.6 | 0.6 | 0.6 |
| $W_3/W_1$ | 0.6 | 0.6 | 0.6 | 0.6 |
| Number of center sipes outward of tire equator line | 1 | 1 | 1 | 1 |
| Presence of opening at ends of center sipes | No | No | No | No |
| Crossing points of center sipes and tire equator line | No | No | No | No |
| Presence of bent portions of center sipes | Yes | Yes | Yes | Yes |
| $\theta_2$ [°] | 4 | 4 | 4 | 4 |
| $D_4/D_1$ | 0.6 | 0.6 | 0.6 | 0.6 |
| Presence of shoulder circumferential narrow grooves | Yes | Yes | Yes | Yes |
| Presence of bent portions of shoulder circumferential narrow grooves | Yes | Yes | Yes | Yes |
| $D_5/D_1$ | 0.8 | 0.8 | 0.8 | 0.8 |
| $W_4$ [mm] | 1 | 3 | 5 | 3 |
| $W_5/W_6$ | 0.3 | 0.3 | 0.3 | 0.03 |
| $D_6/D_1$ | 0.3 | 0.3 | 0.3 | 0.3 |
| $W_1/W_6$ | 0.1 | 0.1 | 0.1 | 0.1 |
| $W_9/W_8$ | 0.8 | 0.8 | 0.8 | 0.8 |
| $W_8/W_{10}$ | 0.1 | 0.1 | 0.1 | 0.1 |
| Heel and toe wear resistance performance | 124 | 123 | 121 | 128 |
| Traction performance on wet road surfaces | 113 | 115 | 116 | 110 |

FIG. 7C

|  | Example 37 | Example 38 | Example 39 | Example 40 | Example 41 |
|---|---|---|---|---|---|
| Arrangement of two circumferential main grooves (Inner half or outer half of tread developed width in tire lateral direction) | Inner side | Inner side | Inner side | Inner side | Inner side |
| Communication of shoulder lug grooves to circumferential main grooves | Yes | Yes | Yes | Yes | Yes |
| Presence of see-through portions of shoulder lug grooves | Yes | Yes | Yes | Yes | Yes |
| Presence of center lug grooves | Yes | Yes | Yes | Yes | Yes |
| Opening of center lug grooves in circumferential main grooves | Yes | Yes | Yes | Yes | Yes |
| Presence of center groove portions (absence: linear center lug grooves) | Yes | Yes | Yes | Yes | Yes |
| Angle $\theta_1$ of center groove portion [°] | 4 | 4 | 4 | 4 | 4 |
| Presence of connection groove portions | Yes | Yes | Yes | Yes | Yes |
| $D_2/D_1$ | 0.7 | 0.7 | 0.7 | 0.7 | 0.7 |
| $D_3/D_1$ | 0.5 | 0.5 | 0.5 | 0.5 | 0.5 |
| $W_2/W_1$ | 0.6 | 0.6 | 0.6 | 0.6 | 0.6 |
| $W_3/W_1$ | 0.6 | 0.6 | 0.6 | 0.6 | 0.6 |
| Number of center sipes outward of tire equator line | 1 | 1 | 1 | 1 | 1 |
| Presence of opening at ends of center sipes | No | No | No | No | No |
| Crossing points of center sipes and tire equator line | No | No | No | No | No |
| Presence of bent portions of center sipes | Yes | Yes | Yes | Yes | Yes |
| $\theta_2$ [°] | 4 | 4 | 4 | 4 | 4 |
| $D_4/D_1$ | 0.3 | 0.6 | 0.9 | 0.6 | 0.6 |
| Presence of shoulder circumferential narrow grooves | Yes | Yes | Yes | Yes | Yes |
| Presence of bent portions of shoulder circumferential narrow grooves | Yes | Yes | Yes | Yes | Yes |
| $D_5/D_1$ | 0.8 | 0.8 | 0.8 | 0.8 | 0.8 |
| $W_4$ [mm] | 3 | 3 | 3 | 3 | 3 |
| $W_5/W_6$ | 0.07 | 0.2 | 0.07 | 0.07 | 0.07 |
| $D_6/D_1$ | 0.3 | 0.3 | 0.5 | 0.8 | 0.9 |
| $W_1/W_6$ | 0.1 | 0.1 | 0.1 | 0.1 | 0.1 |
| $W_9/W_8$ | 0.8 | 0.8 | 0.8 | 0.8 | 0.8 |
| $W_8/W_{10}$ | 0.1 | 0.1 | 0.1 | 0.1 | 0.1 |
| Heel and toe wear resistance performance | 127 | 124 | 126 | 125 | 123 |
| Traction performance on wet road surfaces | 113 | 114 | 114 | 117 | 118 |

FIG. 8A

|  | Example 42 | Example 43 | Example 44 | Example 45 | Example 46 |
|---|---|---|---|---|---|
| Arrangement of two circumferential main grooves (Inner half or outer half of tread developed width in tire lateral direction) | Inner side | Inner side | Inner side | Inner side | Inner side |
| Communication of shoulder lug grooves to circumferential main grooves | Yes | Yes | Yes | Yes | Yes |
| Presence of see-through portions of shoulder lug grooves | Yes | Yes | Yes | Yes | Yes |
| Presence of center lug grooves | Yes | Yes | Yes | Yes | Yes |
| Opening of center lug grooves in circumferential main grooves | Yes | Yes | Yes | Yes | Yes |
| Presence of center groove portions (absence: linear center lug grooves) | Yes | Yes | Yes | Yes | Yes |
| Angle $\theta_1$ of center groove portion [°] | 4 | 4 | 4 | 4 | 4 |
| Presence of connection groove portions | Yes | Yes | Yes | Yes | Yes |
| $D_2/D_1$ | 0.7 | 0.7 | 0.7 | 0.7 | 0.7 |
| $D_3/D_1$ | 0.5 | 0.5 | 0.5 | 0.5 | 0.5 |
| $W_2/W_1$ | 0.6 | 0.6 | 0.6 | 0.6 | 0.6 |
| $W_3/W_1$ | 0.6 | 0.6 | 0.6 | 0.6 | 0.6 |
| Number of center sipes outward of tire equator line | 1 | 1 | 1 | 1 | 1 |
| Presence of opening at ends of center sipes | No | No | No | No | No |
| Crossing points of center sipes and tire equator line | No | No | No | No | No |
| Presence of bent portions of center sipes | Yes | Yes | Yes | Yes | Yes |
| $\theta_2$ [°] | 4 | 4 | 4 | 4 | 4 |
| $D_4/D_1$ | 0.6 | 0.6 | 0.6 | 0.6 | 0.6 |
| Presence of shoulder circumferential narrow grooves | Yes | Yes | Yes | Yes | Yes |
| Presence of bent portions of shoulder circumferential narrow grooves | Yes | Yes | Yes | Yes | Yes |
| $D_5/D_1$ | 0.8 | 0.8 | 0.8 | 0.8 | 0.8 |
| $W_4$ [mm] | 3 | 3 | 3 | 3 | 3 |
| $W_5/W_6$ | 0.07 | 0.07 | 0.07 | 0.07 | 0.07 |
| $D_6/D_1$ | 0.8 | 0.8 | 0.8 | 0.8 | 0.8 |
| $W_1/W_6$ | 0.01 | 0.03 | 0.07 | 0.03 | 0.03 |
| $W_9/W_8$ | 0.8 | 0.8 | 0.8 | 0.5 | 0.6 |
| $W_8/W_{10}$ | 0.1 | 0.1 | 0.1 | 0.1 | 0.1 |
| Heel and toe wear resistance performance | 129 | 128 | 126 | 124 | 126 |
| Traction performance on wet road surfaces | 113 | 115 | 116 | 119 | 118 |

FIG. 8B

|  | Example 47 | Example 48 | Example 49 | Example 50 |
|---|---|---|---|---|
| Arrangement of two circumferential main grooves (Inner half or outer half of tread developed width in tire lateral direction) | Inner side | Inner side | Inner side | Inner side |
| Communication of shoulder lug grooves to circumferential main grooves | Yes | Yes | Yes | Yes |
| Presence of see-through portions of shoulder lug grooves | Yes | Yes | Yes | Yes |
| Presence of center lug grooves | Yes | Yes | Yes | Yes |
| Opening of center lug grooves in circumferential main grooves | Yes | Yes | Yes | Yes |
| Presence of center groove portions (absence: linear center lug grooves) | Yes | Yes | Yes | Yes |
| Angle $\theta_1$ of center groove portion [°] | 4 | 4 | 4 | 4 |
| Presence of connection groove portions | Yes | Yes | Yes | Yes |
| $D_2/D_1$ | 0.7 | 0.7 | 0.7 | 0.7 |
| $D_3/D_1$ | 0.5 | 0.5 | 0.5 | 0.5 |
| $W_2/W_1$ | 0.6 | 0.6 | 0.6 | 0.6 |
| $W_3/W_1$ | 0.6 | 0.6 | 0.6 | 0.6 |
| Number of center sipes outward of tire equator line | 1 | 1 | 1 | 1 |
| Presence of opening at ends of center sipes | No | No | No | No |
| Crossing points of center sipes and tire equator line | No | No | No | No |
| Presence of bent portions of center sipes | Yes | Yes | Yes | Yes |
| $\theta_2$ [°] | 4 | 4 | 4 | 4 |
| $D_4/D_1$ | 0.6 | 0.6 | 0.6 | 0.6 |
| Presence of shoulder circumferential narrow grooves | Yes | Yes | Yes | Yes |
| Presence of bent portions of shoulder circumferential narrow grooves | Yes | Yes | Yes | Yes |
| $D_5/D_1$ | 0.8 | 0.8 | 0.8 | 0.8 |
| $W_4$ [mm] | 3 | 3 | 3 | 3 |
| $W_5/W_6$ | 0.07 | 0.07 | 0.07 | 0.07 |
| $D_6/D_1$ | 0.8 | 0.8 | 0.8 | 0.8 |
| $W_1/W_6$ | 0.03 | 0.03 | 0.03 | 0.03 |
| $W_9/W_8$ | 0.7 | 0.6 | 0.6 | 0.6 |
| $W_8/W_{10}$ | 0.1 | 0.2 | 0.4 | 0.6 |
| Heel and toe wear resistance performance | 127 | 127 | 128 | 127 |
| Traction performance on wet road surfaces | 116 | 118 | 118 | 118 |

FIG. 8C

PNEUMATIC TIRE

TECHNICAL FIELD

The present technology relates to a pneumatic tire.

BACKGROUND ART

In the related art, for example, a heavy duty tire described in Japan Unexamined Patent Publication No. H05-162511 is designed to suppress the occurrence of heal-and-toe wear in small blocks and improve the wear resistance of the entire blocks. The heavy duty tire is provided with a main groove extending in a tire circumferential direction and a lateral groove intersecting the main groove in a tread surface, and blocks defined by the main groove and the lateral groove are formed. A plurality of sipes crossing the blocks in the tire circumferential direction are provided, and each sipe has a structure of not communicating with the main groove. The number of sipes provided in the block is three or more in the tire circumferential direction, and a sipe depth at both end portions in the tire circumferential direction is shallower than a sipe depth in the middle.

Further, for example, a heavy duty tire described in Japan Unexamined Patent Publication No. 2006-151083 is designed to improve wear resistance on wet and dry road surfaces. In the heavy duty tire, a pair of circumferential auxiliary grooves are formed on both sides of a tire equatorial plane in a tread surface, and thus disposing a row of a center land portion row. A distance between width center lines of the circumferential auxiliary grooves falls within a range of from 25% to 50% of a tread width. Lateral fine grooves connecting the circumferential auxiliary grooves are formed, and thus the center land portion row is formed of dummy block rows. Block rows defined by the circumferential auxiliary grooves and lug grooves are formed on both sides of the circumferential auxiliary grooves in a tire lateral direction. A negative ratio of the center land portion row and a negative ratio of the block rows fall within a range of from 10% to 20% and a range of from 15% to 27%, respectively. A groove depth of the circumferential auxiliary grooves and the lateral fine grooves falls within a range of from 70% to 100% of a groove depth of the lug grooves. A groove width of the circumferential auxiliary grooves and the lateral fine grooves fall within a range of from 5% to 15% and a range of from 3.5% to 4.5% of one pitch of the lug grooves, respectively. An average angle of the lug grooves with respect to the circumferential direction falls within a range of from 65° to 80°.

Also, for example, the pneumatic tire described in Japan Unexamined Patent Publication No. 2011-251685 is designed to achieve wet performance and wear resistance performance in a well-balanced manner. The pneumatic tire is provided with a lateral groove in a tread surface, and the lateral groove includes a first bent portion including: a first part in which a lateral groove center line passing through the middle between groove edges in the tread surface that is brought into contact with a road surface extends at an angle θ1 with respect to a tire lateral direction; and a second part being continuous to the first part and extending at an angle θ2 (≠θ1) with respect to the tire lateral direction. The lateral groove includes a second bent portion including a third part in which the lateral groove center line is continuous to the second part and extends at an angle θ3 (≠θ2) with respect to the tire axial direction. In a new tire, a bending angle θa0 of the first bent portion, which is indicated with |θ2−θ1|, falls within a range of from 30° to 50°. In a new tire, a bending angle θb0 of the second bent portion, which is indicated with |θ3−θ2|, falls within a range of from 30° to 50°. At the time of 50% wear, a bending angle θa50 of the first bent portion is from 0.35 times to 0.65 times of the angle θa0. At the time of 50% wear, a bending angle θb50 of the second bent portion is from 0.35 times to 0.65 times of the angle θb0. Moreover, in the tread surface, oblique narrow grooves inclined with respect to the tire circumferential direction are provided by extending between the lateral grooves adjacent to each other in the tire circumferential direction and by connecting the first bent portions and the second bent portions of the lateral grooves.

Incidentally, in a pneumatic tire used for wide area transportation, mainly urban transportation (particularly, a heavy duty pneumatic tire), lug grooves extending in a tire lateral direction are provided in a tread surface in order to improve traction performance on wet road surfaces. However, generally, in a pattern including the lug grooves as main components, block rigidity in a tire circumferential direction is more likely to be degraded, and heal-and-toe wear resistance performance tends to be degraded.

SUMMARY

The present technology provides a pneumatic tire capable of improving heal-and-toe wear resistance performance and traction performance.

The pneumatic tire according to one aspect of the present technology includes: at least two circumferential main grooves being provided and extending continuously along a tire circumferential direction in a tread surface, all of the circumferential main grooves being disposed in an inner half of a tread developed width in a tire lateral direction; shoulder land portions being formed outward of outermost circumferential main grooves in the tire lateral direction, the outermost circumferential main grooves being on outermost sides in the tire lateral direction; a plurality of shoulder lug grooves being provided to communicate with the outermost circumferential main grooves from outer edges of the tread surface in the tire lateral direction, being provided side by side in the tire circumferential direction, dividing the shoulder land portions into shoulder block portions, and each including a see-through portion in the tire lateral direction; a center land portion being defined by a pair of innermost circumferential main grooves on an innermost side in the tire lateral direction, the pair of innermost circumferential main grooves being adjacent to each other across a tire equator line; and a plurality of center lug grooves being provided in the center land portion to communicate with each of the pair of innermost circumferential main grooves in the tire lateral direction, being provided side by side in the tire circumferential direction, and dividing the center land portion into a plurality of center block portions, the plurality of center lug grooves each including: two end groove portions having ends opening to the pair of innermost circumferential main grooves; and one center groove portion extending between other ends of the end groove portions at an angle different from the end groove portions, having at least a part disposed on the tire equator line, and having an angle $\theta_1$ with respect to the tire equator line, which satisfies $-45° \le \theta_1 \le +15°$.

Further, in the pneumatic tire according to one aspect of the present technology, the center lug groove preferably includes connection groove portions that connect the other ends of the end groove portions and ends of the center groove portion and are disposed to extend at an angle different from the end groove portions and the center groove portion.

Further, in the pneumatic tire according to one aspect of the present technology, a maximum groove depth $D_1$ in the tread surface, a groove depth $D_2$ of the center groove portion, and a groove depth $D_3$ of the end groove portions preferably satisfy relationships of $D_1 > D_2 \geq D_3$, $0.5 \leq D_2/D_1 \leq 0.8$, and $0.2 \leq D_3/D_1 \leq 0.7$.

Further, in the pneumatic tire according to one aspect of the present technology, a groove width $W_1$ of the innermost circumferential main groove, a groove width $W_2$ of the center groove portion, and a groove width $W_3$ of the end groove portion preferably satisfy relationships of $W_1 > W_2$, $W_1 > W_3$, $0.3 \leq W_2/W_1 \leq 0.8$, and $0.3 \leq W_3/W_1 \leq 0.8$.

Further, in the pneumatic tire according to one aspect of the present technology, the center block portion preferably includes one center sipe that has both ends being terminated and that is each formed outward of the tire equator line in the tire lateral direction without intersecting the tire equator line, and the center sipe preferably includes at least one bent portion.

Further, in the pneumatic tire according to one aspect of the present technology, the center sipe preferably includes two sipe portions having different angles via the one bent portion, and an angle $\theta_2$ of one of the sipe portions with respect to the tire equator line preferably satisfies $0° \leq \theta_2 \leq 15°$.

Further, in the pneumatic tire according to one aspect of the present technology, a groove depth $D_4$ of the center sipe and the maximum groove depth $D_1$ in the tread surface preferably satisfy a relationship of $0.3 \leq D_4/D_1 \leq 0.9$.

Further, in the pneumatic tire according to one aspect of the present technology, the shoulder block portion preferably, extends in the tire circumferential direction in a shape that allows the shoulder lug grooves adjacent to each other in the tire circumferential direction to communicate with each other and includes a shoulder circumferential narrow groove including a bent portion in a midway, and a groove depth $D_5$ of the shoulder circumferential narrow groove and the maximum groove depth $D_1$ in the tread surface preferably satisfy a relationship of $0.6 \leq D_5/D_1 \leq 0.9$.

Further, in the pneumatic tire according to one aspect of the present technology, the shoulder circumferential narrow groove preferably has a groove width $W_4$ satisfying $1 \text{ mm} \leq W_4 \leq 5 \text{ mm}$.

Further, in the pneumatic tire according to one aspect of the present technology, a groove width $W_5$ of the shoulder lug groove and the tread developed width $W_6$ preferably satisfy a relationship of $0.03 \leq W_5/W_6 \leq 0.20$.

Further, in the pneumatic tire according to one aspect of the present technology, the shoulder lug groove preferably includes a raised bottom portion on a groove bottom, and a groove depth $D_6$ of the raised bottom portion and the maximum groove depth $D_1$ in the tread surface preferably satisfy a relationship of $0.5 \leq D_6/D_1 \leq 0.9$.

Further, in the pneumatic tire according to one aspect of the present technology, the groove width $W_1$ of the innermost circumferential main groove and the tread developed width $W_6$ preferably satisfy a relationship of $0.01 \leq W_1/W_6 \leq 0.07$.

Further, in the pneumatic tire according to one aspect of the present technology, the innermost circumferential main groove preferably includes a bent portion, and a maximum width $W_8$ and a minimum width $W_9$ of the center block portion in the tire lateral direction preferably satisfy a relationship of $0.5 \leq W_9/W_8 \leq 0.7$.

Further, in the pneumatic tire according to one aspect of the present technology, in a tread portion forming the tread surface, a pair of cross belts that are wound in the tire circumferential direction and that include cords intersecting each other are preferably provided, and a narrow belt width $W_{10}$ of the cross belts in the tire lateral direction and a maximum width $W_8$ of the center block portion in the tire lateral direction preferably satisfy a relationship of $0.2 \leq W_8/W_{10} \leq 0.6$.

According to the present technology, the circumferential main grooves all of which are disposed in the inner half of the tread developed width of the tread surface in the tire lateral direction; the shoulder lug grooves that divide the shoulder land portions into the shoulder block portions and that each include the see-through portion; and the center lug grooves that divide the center land portion into the center block portions are included. Thus, due to the drainage performance of the shoulder lug grooves and the center lug grooves and an edge effect exerted by the division of the shoulder block portions and the center block portions, traction performance on wet road surfaces can be improved. Additionally, the center lug grooves each include: the two end groove portions and the one center groove portion on the tire equator line between the end groove portions, which has the angle $\theta_1$ with respect to the tire equator line satisfying $-45° \leq \theta_1 \leq +15°$. With this, the angle of the center block portion is prevented from being acute on the stepping side, and hence block rigidity is secured. Thus, heal-and-toe wear resistance performance can be improved.

BRIEF DESCRIPTION OF DRAWINGS

FIG. 2 is a plan view of the pneumatic tire according to the embodiment of the present technology.

FIGS. 5A-5D include a table showing the results of performance tests of pneumatic tires according to examples of the present technology.

FIGS. 6A-6C include a table showing the results of performance tests of pneumatic tires according to examples of the present technology.

FIGS. 7A-7C include a table showing the results of performance tests of pneumatic tires according to examples of the present technology.

FIGS. 8A-8C include a table showing the results of performance tests of pneumatic tires according to examples of the present technology.

DETAILED DESCRIPTION

Now, with reference to the drawings, an embodiment of the present technology is described, but the present technology is not limited thereto. Further, constituent elements described in the following embodiment can be combined, or a part of the constituent elements may not be used.

In the following description, a tire lateral direction refers to a direction that is parallel with the rotation axis of a pneumatic tire. Inward in the tire lateral direction refers to a direction toward a tire equatorial plane in the tire lateral direction. Outward in the tire lateral direction refers to a direction opposite the direction toward the tire equatorial plane in the tire lateral direction. Further, a tire radial direction refers to a direction orthogonal to the tire rotation axis. Inward in the tire radial direction refers to a direction toward the tire rotation axis in the tire radial direction.

Outward in the tire radial direction refers to a direction away from the tire rotation axis in the tire radial direction. Further, a tire circumferential direction refers to a direction of rotation about the tire rotation axis.

The tire equatorial plane refers to a plane orthogonal to the tire rotation axis and passing through the center in the tire lateral direction, and the tire equator line refers to a center line at which the tire equatorial plane and a surface of a tread portion of the pneumatic tire intersect. In the present embodiment, the tire equator line and the tire equatorial plane are denoted with the same reference sign "CL".

A pneumatic tire 1 according to the present embodiment is a tubeless tire. Further, the pneumatic tire 1 according to the present embodiment is a heavy duty pneumatic tire that is mounted to a truck and a bus. A tire for a truck and a bus (heavy duty pneumatic tire) refers to a tire defined in Chapter C in "JATMA YEAR BOOK" issued by Japan Automobile Tire Manufacturers Association (JATMA). Note that the pneumatic tire 1 may be mounted to a passenger car and a light truck.

Figure 1:
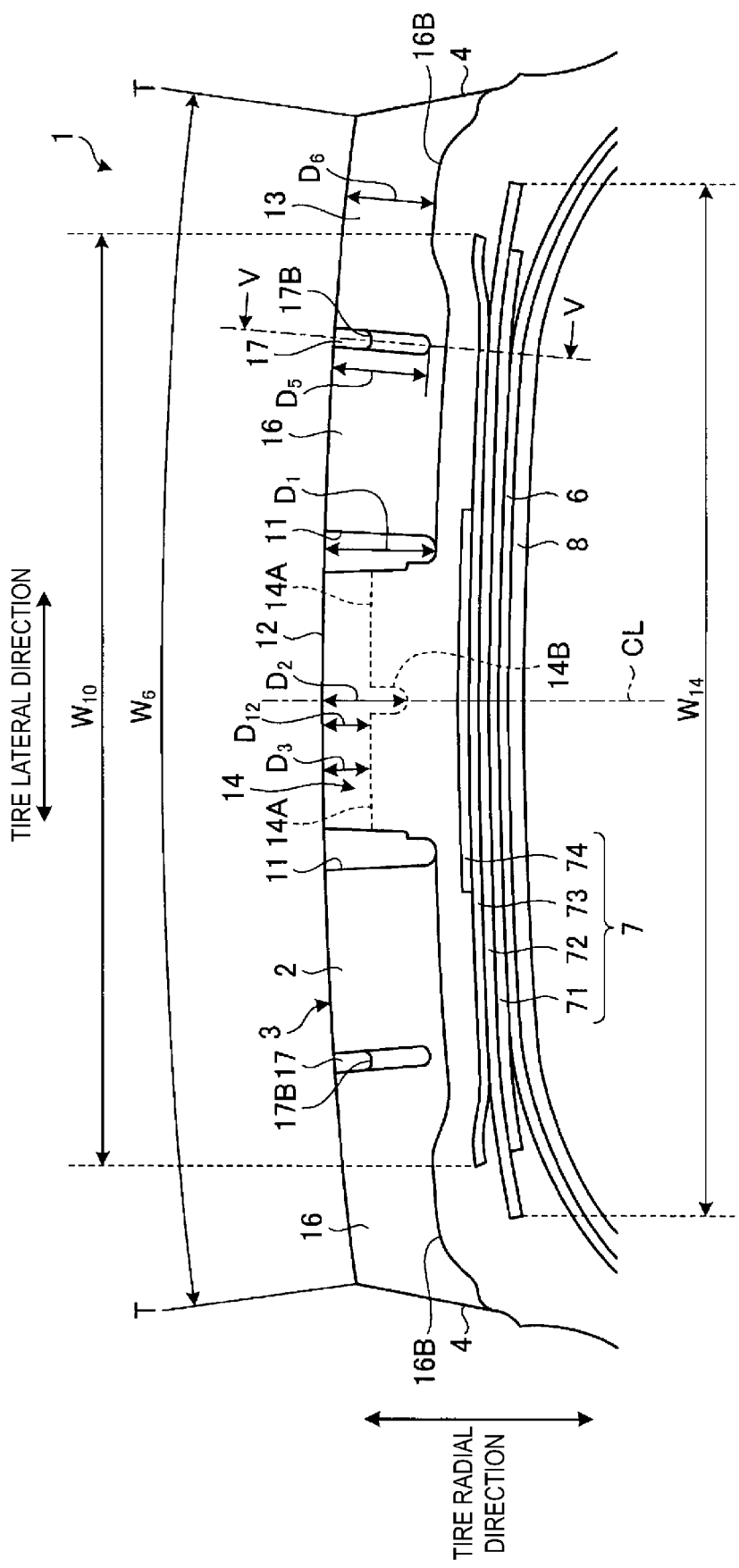
FIG. 1 is a meridian cross-sectional view of a pneumatic tire according to an embodiment of the present technology.

FIG. 1 is a meridian cross-sectional view of a pneumatic tire according to the present embodiment. The meridian cross-section is the cross-section passing through the tire rotation axis.

In a meridian cross-sectional view, in the pneumatic tire 1 illustrated in FIG. 1, a tread portion 2 formed of a rubber material is disposed in the outermost portion in the tire radial direction. Both ends of the tread portion 2 in the tire lateral direction are formed as shoulder portions 4.

Although not illustrated, sidewall portions are disposed from the shoulder portions 4 to predetermined positions inward in the tire radial direction. The sidewall portions are disposed at two positions on both sides of the pneumatic tire 1 in the tire lateral direction. Further, although not illustrated, a bead portion is positioned inward of each of the sidewall portions in the tire radial direction. Similarly to the sidewall portions, the bead portions are disposed at two positions on both sides of the tire equatorial plane CL. Specifically, a pair of the bead portions are disposed on both sides of the tire equatorial plane CL in the tire lateral direction. The bead portion is provided with a bead core. The bead core is formed by winding a bead wire, which is a steel wire, into a ring shape. The bead portion is formed so as to be mounted to a specified rim with a 15-degree taper. The specified rim referred to herein refers to an "applicable rim" specified by JATMA, a "Design Rim" specified by TRA (The Tire and Rim Association, Inc.), or a "Measuring Rim" specified by ETRTO (The European Tyre and Rim Technical Organisation). Specifically, in the pneumatic tire 1 according to the present embodiment, a portion to be fitted to the bead portion, which is inclined at an inclination angle of 15° with respect to the rotation axis, can be mounted to a specified rim.

A belt layer 7 is provided inward of the tread portion 2 in the tire radial direction. For example, the belt layer 7 has a multilayer structure in which four layers including belts 71, 72, 73, and 74 are layered. The belts 71, 72, 73, and 74 are formed by performing a rolling process on a plurality of coating rubber-covered belt cords made of steel. Further, an inclination angle of the belts 71, 72, 73, and 74 with respect to the tire circumferential direction is set to fall within a range of from 15° to 70°, for example. The belts 72 and 73 among the belt layer 7 having a plurality of layers, which are the second layer and the third layer from the tire inner circumferential side, function as reinforcing layers and are arranged such that the belt cords intersect between the layers. Those belts 72 and 73 refer to cross belts. Note that, between the belts 71 and 72 being the first layer and the second layer from the tire inner circumferential side, the belt cords are inclined in the same direction. Between the belts 73 and 74 being the third layer and the fourth layer from the tire inner circumferential side, the belt cords are inclined also in the same direction.

A carcass layer 6 that encapsulates cords of a radial ply is continuously provided inward of the belt layer 7 in the tire radial direction and in an inner portion of the sidewall portions. The carcass ply of the carcass layer 6 is formed by performing a rolling process on coating rubber-covered carcass cords made of steel. The carcass layer 6 is supported by a pair of the bead cores. The carcass layer 6 has a single layer structure made of one carcass ply and extends in a toroidal shape in the tire circumferential direction, between the bead cores disposed on both sides in the tire lateral direction, forming the framework of the pneumatic tire 1. Specifically, the carcass layer 6 is disposed from one bead portion to the other bead portion of the pair of bead portions positioned on both sides in the tire lateral direction, and the carcass layer 6 turns back outward in the tire lateral direction along the bead cores, wrapping the bead cores. Specifically, the carcass layer 6 passes through inward of the bead cores in the tire radial direction from inward of the bead cores in the tire lateral direction, and the carcass layer 6 is folded back at the bead cores such that ends are disposed outward of the bead cores in the tire lateral direction.

Additionally, an innerliner 8 is formed along the carcass layer 6, inward of the carcass layer 6 or on the inner side of the carcass layer 6 with respect to the pneumatic tire 1. The innerliner 8 is a tire inner surface, that is, an inner circumferential surface of the carcass layer 6, has both end portions in the tire lateral direction each of which reaches a lower part of the bead core or a bead toe of the pair of bead portions, and is wound in a toroidal shape in the tire circumferential direction and bonded to the bead portions. The innerliner 8 does not have cords because the innerliner 8 is provided to suppress the permeation of air molecules.

Figure 2:
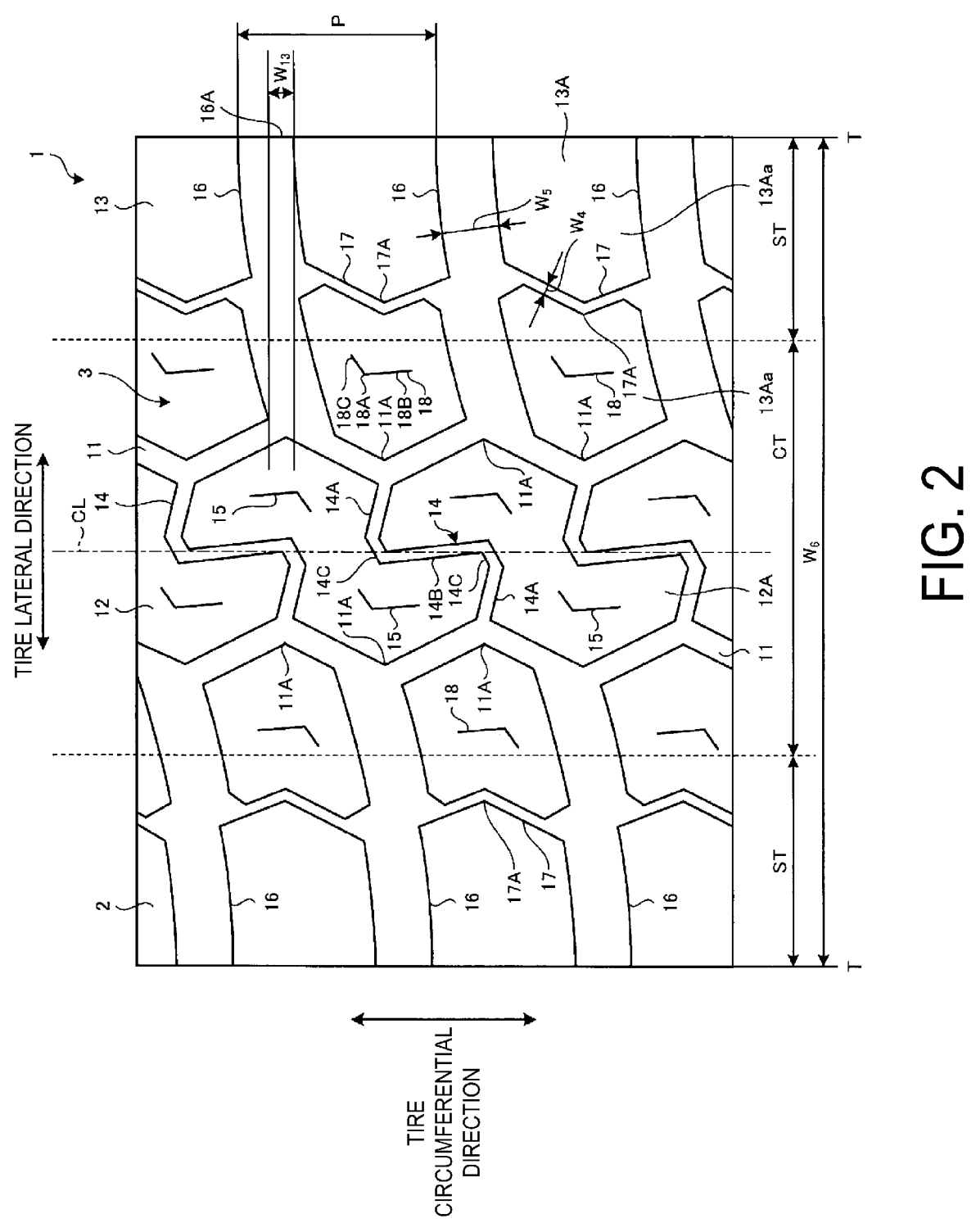
Figure 3:
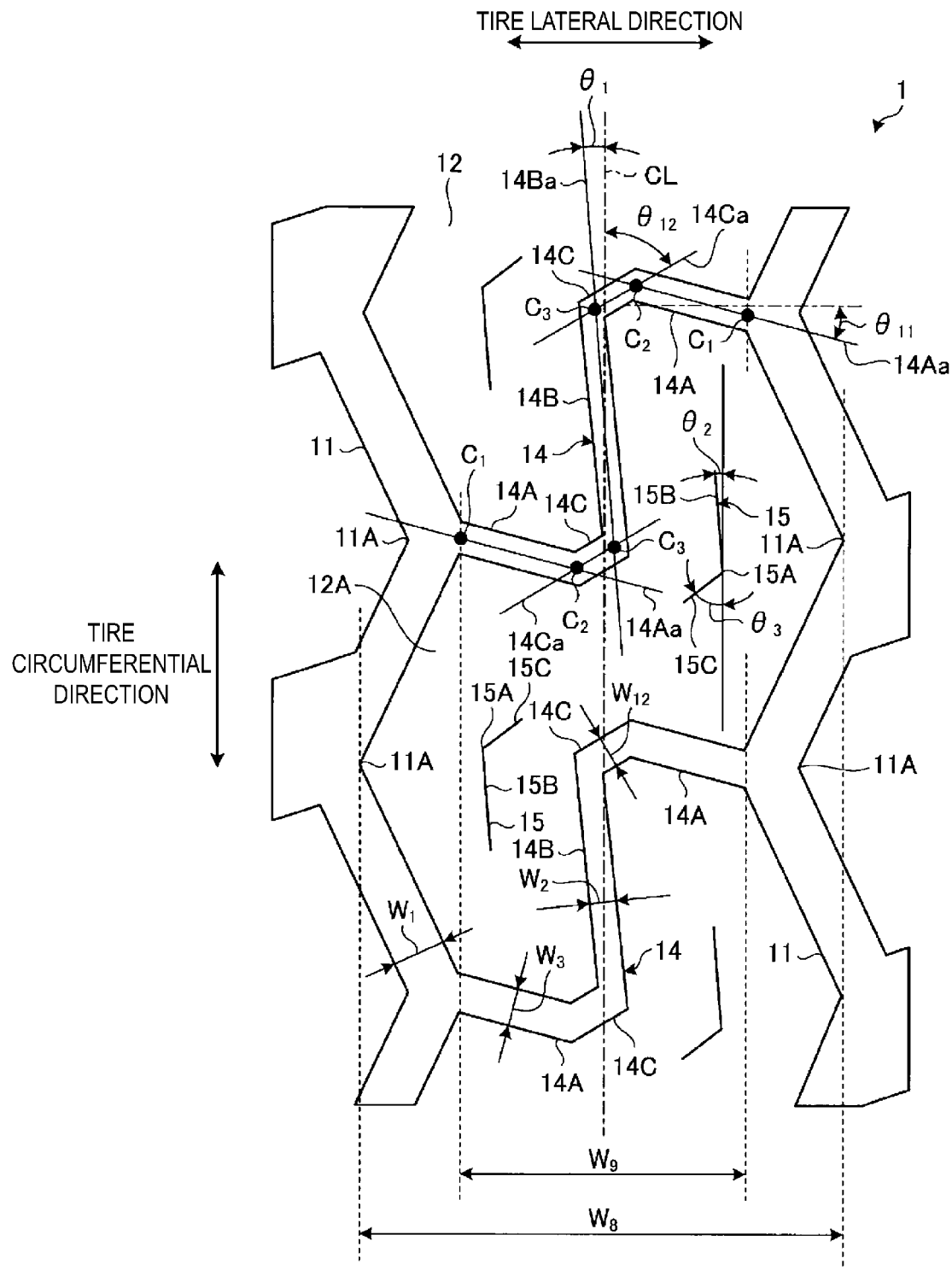
FIG. 3 is a partially enlarged plan view of the pneumatic tire according to the embodiment of the technology.
Figure 4:
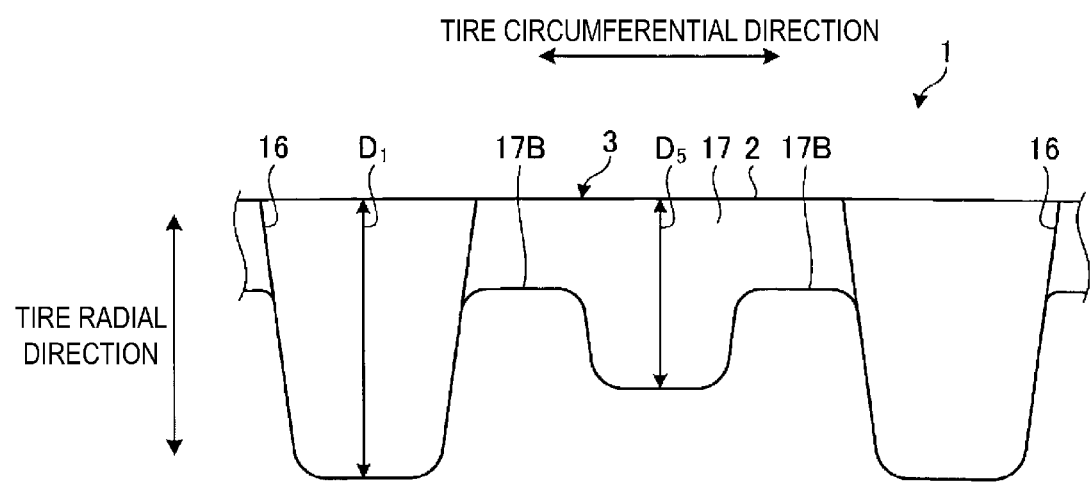
FIG. 4 is an enlarged view taken along the line V-V of FIG. 1.

FIG. 2 is a plan view of the pneumatic tire according to the present embodiment. FIG. 3 is a partially enlarged plan view of the pneumatic tire according to the present embodiment. FIG. 4 is an enlarged view taken along the line V-V of FIG. 1.

The surface of the tread portion 2, that is, a portion brought into contact with road surfaces when a vehicle to which the pneumatic tire 1 is mounted travels, is formed as a tread surface 3. A plurality of circumferential main grooves 11 continuously extending along the tire circumferential direction are arranged side by side in the tire lateral direction in the tread surface 3. In the drawing, at least two circumferential main grooves 11 are provided, and two grooves are illustrated as the circumferential main grooves 11. When an inner half of a tread developed width $W_6$ of the tread surface 3 in the tire lateral direction is referred to as a center region CT and an outer half of the tread developed width $W_6$ of the tread surface 3 in the tire lateral direction is referred to as a shoulder region ST, all the circumferential main grooves 11 are arranged in the center region CT. Being arranged in the center region CT indicates that the entire circumferential main grooves 11 are included in the center region CT. Further, the circumferential main groove 11 is a groove having a groove depth $D_1$ satisfying 10 mm≤$D_1$ and a groove width $W_1$ satisfying 5 mm≤$W_1$. A pair of the circumferential main grooves 11 adjacent to each other across a tire equator line CL are innermost circumferential main grooves disposed at innermost positions in the tire lateral direction, and a pair of innermost circumferential main grooves define a center land portion 12 on the tire equator line CL. Further, a pair of the circumferential main grooves 11 are outermost circumferential main grooves on both sides disposed at outermost positions in the tire lateral direction, and shoulder land portions 13 are defined outward of the outermost circumferential main grooves in the tire lateral direction. In the drawing, the same structure formed of the circumferential main groove 11 is illustrated as the innermost circumferential main groove and the outermost circumferential main groove, and hence the innermost circumferential main groove and the outermost circumferential main groove are denoted with the same reference sign "11". Further, the innermost circumferential main groove 11 includes a bent portion 11A and thus is formed in a zigzag shape that is bent to have a predetermined width in the tire lateral direction. In those innermost circumferential main grooves 11, positions of the bent portions 11A in a zigzag shape are aligned in the tire circumferential direction, and the bent portions 11A are provided to be bent inward and outward in opposite directions across the tire equator line CL in the tire lateral direction. Specifically, in each of the innermost circumferential main grooves 11, the positions of the bent portions 11A are aligned in the tire circumferential direction, but the bent portions 11A bent inward in the tire lateral direction and the bent portions 11A bent outward in the tire lateral direction are disposed to be shifted in the tire circumferential direction.

Here, the tread developed width $W_6$ refers to a length along a profile of a meridian cross-section of the tread surface 3 between outer edges T of the tread surface 3 in the tire lateral direction when the pneumatic tire 1 is mounted to a specified rim with a specified air pressure in an unloaded state. The outer edges T of the tread surface 3 in the tire lateral direction also refer to developed width edges of the tread developed width $W_6$, which are ground contact edges. The ground contact edges refer to both ends of a ground contact width in the tire lateral direction when the ground contact width refers to a maximum linear distance in a tire axial direction (tire lateral direction) of a contact surface with a flat plate when the pneumatic tire is mounted to a specified rim with a specified air pressure, is placed vertically on the flat plate in a static state, and is applied with a load equivalent to a specified mass. Note that, the specified rim refers to an "applicable rim" specified by JATMA, a "Design Rim" specified by TRA, or a "Measuring Rim" specified by ETRTO. Further, the specified internal pressure refers to the maximum air pressure specified by JATMA, the maximum value described in "TIRE LOAD LIMITS AT VARIOUS COLD INFLATION PRESSURES" specified by TRA, or "INFLATION PRESSURES" specified by ETRTO.

In the center land portion 12 defined by the innermost circumferential main grooves 11, center lug grooves 14 are formed. The center lug groove 14 is provided to have both ends opening to each of the innermost circumferential main grooves 11 so as to communicate with each of the innermost circumferential main grooves 11 in the tire lateral direction, and a plurality of the center lug grooves 14 are provided side by side in the tire circumferential direction. Therefore, the center land portion 12 formed on the tire equator line CL is divided by each of the center lug grooves 14 into a plurality of center block portions 12A arranged side by side in the tire circumferential direction.

As illustrated in FIGS. 2 and 3, the center lug groove 14 includes end groove portions 14A, a center groove portion 14B, and connection groove portions 14C. The end groove portions 14A are two grooves mainly extending linearly along the tire lateral direction and have one end opening to the pair of innermost circumferential main grooves 11 and the other end reaching the center land portion 12. The center groove portion 14B is one groove that extends at an angle different from the end groove portions 14A and mainly extends linearly along the tire circumferential direction and has at least a part disposed on the tire equator line CL and both ends provided in the center land portion 12. The connection groove portions 14C are two grooves that extend at an angle different from the end groove portions 14A and the center groove portion 14B, have both ends provided in the center land portion 12, and connect the other ends of the end groove portions 14A and the ends of the center groove portion 14B linearly. Therefore, the other ends of the end groove portions 14A are connected to both ends of the center groove portion 14B disposed on the tire equator line CL via the connection groove portions 14C, and the ends of the end groove portions 14A are provided to be connected to each of the innermost circumferential main grooves 11. Thus, the center lug groove 14 as a whole is formed in a substantially Z-like shape. Further, in the center lug groove 14, the end of the end groove portion 14A communicates with each of the innermost circumferential main grooves 11 at the position of the bent portion 11A bent inward in the tire lateral direction. Note that the connection groove portions 14C are not provided in some cases. In such case, the end groove portions 14A and the center groove portion 14B are connected directly.

In the center lug groove 14, the center groove portion 14B has an angle $\theta_1$ (see FIG. 3) with respect to the tire circumferential direction (tire equator line CL), which satisfies $-45° \leq \theta_1 \leq +15°$. The angle $\theta_1$ is an angle formed with a center line 14Ba passing through the center of the groove width of the center groove portion 14B. A minus (−) indicates an obtuse angle with respect to a center line 14Aa passing through the center of the end groove portions 14A with the tire circumferential direction (tire equator line CL) as a reference, and a plus (+) indicates an acute angle with respect to the center line 14Aa passing through the center of the end groove portions 14A with the tire circumferential direction (tire equator line CL) as a reference. The center groove portion 14B is a groove having a groove depth $D_2$ (see FIG. 1) satisfying 15 mm$\leq D_2 \leq$20 mm and a groove width $W_2$ (see FIG. 3) satisfying 4 mm$\leq W_2 \leq$10 mm.

In the center lug groove 14, the end groove portion 14A has an angle $\theta_{11}$ (see FIG. 3) with respect to the tire lateral direction, which satisfies $5° \leq \theta_{11} \leq 35°$. The angle $\theta_{11}$ is an angle formed with the center line 14Aa passing through the center of the groove width of the end groove portion 14A. The end groove portion 14A is a groove having a groove depth $D_3$ (see FIG. 1) satisfying 7 mm$\leq D_3 \leq$15 mm and a groove width $W_3$ (see FIG. 3) satisfying 4 mm$\leq W_3 \leq$10 mm.

In the center lug groove 14, the connection groove portion 14C has an angle $\theta_{12}$ (see FIG. 3) with respect to the tire circumferential direction (tire equator line CL), which satisfies $20° \leq \theta_{12} \leq 70°$. The angle $\theta_{12}$ is an angle formed with a center line 14Ca passing through the center of the groove width of the connection groove portions 14C. The connection groove portion 14C is a groove having a groove depth $D_{12}$ (see FIG. 1) satisfying 7 mm$\leq D_{12} \leq$20 mm and a groove width $W_{12}$ (see FIG. 3) satisfying 4 mm$\leq W_{12} \leq$10 mm.

As illustrated in FIGS. 2 and 3, center sipes 15 are formed in the center block portion 12A. The center sipe 15 is provided with both ends terminated in the center block portion 12A. Further, the center sipe 15 is each provided outward of the tire equator line CL in the tire lateral direction without intersecting the tire equator line CL. Further, the center sipe 15 includes at least one bent portion 15A and at least two sipe portions 15B and 15C. In the present embodiment, the center sipe 15 includes one bent portion 15A and two linear sipe portions 15B and 15C. Further, the one sipe portion 15B mainly extends along the tire circumferential direction (tire equator line CL), and an angle $\theta_2$ (see FIG. 3) with respect to the tire circumferential direction (tire equator line CL) satisfies $0°≤\theta_2≤15°$. The angle $\theta_2$ is an angle formed with a center line (not shown) passing through the center of the groove width of the one sipe portion 15B. Further, the other sipe portion 15C has an angle $\theta_3$ (see FIG. 3) with respect to the tire circumferential direction (tire equator line CL), which is larger than the one sipe portion 15B and satisfies $35°≤\theta_3≤60°$. The angle $\theta_3$ is an angle formed with a center line (not shown) passing through the center of the groove width of the other sipe portion 15C. The center sipe 15 (sipe portions 15B and 15C) is a groove having a groove depth $D_4$ (not shown) satisfying 9 mm$≤D_4≤$17 mm and a groove width $W_{15}$ (not shown) satisfying 0.4 mm$≤W_{15}≤$1.0 mm.

In the shoulder land portions 13 defined by the outermost circumferential main grooves 11, shoulder lug grooves 16 are formed. The shoulder lug groove 16 is provided from the outer edge T in the tire lateral direction so as to communicate with the outermost circumferential main groove 11, and a plurality of the shoulder lug grooves 16 are provided side by side in the tire circumferential direction. Therefore, the shoulder land portions 13 are divided by the shoulder lug grooves 16 into a plurality of shoulder block portions 13A arrayed in the tire circumferential direction. Further, the shoulder lug groove 16 includes a see-through portion 16A in the tire lateral direction. The see-through portion 16A is formed such that, when viewed in the tire lateral direction from the outer edge T in the tire lateral direction or the outermost circumferential main groove 11, the outermost circumferential main groove 11 or the outer edge T in the tire lateral direction that is positioned on the opposite side can be seen through without interference of its own groove wall. Further, the shoulder lug groove 16 communicates with the outermost circumferential main groove 11 at the position of the bent portion 11A bent outward in the tire lateral direction. The shoulder lug groove 16 is a groove having the groove depth $D_1$ satisfying (see FIG. 4) 14 mm$≤D_1≤$28 mm and a groove width $W_5$ (see FIG. 2) satisfying 10 mm$≤W_5≤$20 mm. Here, the groove depth of the shoulder lug groove 16 is equivalent to the groove depth of the circumferential main groove 11 described above and is the maximum groove depth for all the grooves formed in the tread surface 3. Thus, the groove depth of the shoulder lug groove 16 and the circumferential main groove 11 is denoted with a reference sign "$D_1$". Further, a width $W_{13}$ of the see-through portion 16A of the shoulder lug groove 16 in the tire circumferential direction satisfies 5 mm$≤W_{13}≤$15 mm. Further, when the innermost circumferential main groove and the outermost circumferential main groove are present as the circumferential main grooves 11, the shoulder lug groove 16 preferably communicates with the innermost circumferential main groove in order to improve traction performance on wet road surfaces.

The shoulder lug groove 16 includes a raised bottom portion 16B on a groove bottom. The raised bottom portion 16B is provided in the shoulder region ST in the shoulder lug groove 16 and is provided in the midway outward of a shoulder circumferential narrow groove 17 described later in the tire lateral direction. The raised bottom portion 16B has a minimum groove depth $D_6$ (see FIG. 1) that satisfies 11 mm$≤D_6≤$22 mm and is smaller than the groove depth $D_1$ of the shoulder lug groove 16 (the maximum groove depth).

The shoulder circumferential narrow groove 17 is formed in the shoulder block portion 13A. The shoulder circumferential narrow groove 17 extends continuously in the tire circumferential direction in a shape that allows the shoulder lug grooves 16 to communicate with each other. The shoulder circumferential narrow groove 17 is provided in the shoulder region ST. Therefore, the shoulder circumferential narrow groove 17 divides the shoulder block portion 13A in the tire lateral direction into small shoulder block portions 13Aa. Further, the shoulder circumferential narrow groove 17 includes a bent portion 17A in the midway (center portion). The shoulder circumferential narrow groove 17 is bent inward in the tire lateral direction. When only the pair of circumferential main grooves 11 are provided and when the innermost circumferential main groove and the outermost circumferential main groove are the same, the shoulder circumferential narrow groove 17 is provided to have the bent portion 17A bent inward in the tire lateral direction, similarly to the bent portion 11A of the circumferential main groove 11. The shoulder circumferential narrow groove 17 is a groove having a groove depth $D_5$ (see FIG. 1) satisfying 11 mm$≤D_5≤$24 mm and a groove width $W_4$ satisfying 1 mm$≤W_4≤$5 mm. Note that, as illustrated in FIGS. 1 and 4, the shoulder circumferential narrow groove 17 includes a raised bottom portion 17B at the end opening to the shoulder lug groove 16, and the groove depth $D_5$ is the deepest groove depth at the center portion other than the raised bottom portion 17B.

As illustrated in FIG. 2, in the small shoulder block portion 13Aa inward in the tire lateral direction, a shoulder sipe 18 is formed. The shoulder sipe 18 is provided to have both ends terminated in the small shoulder block portion 13Aa. Further, one shoulder sipe 18 is provided in the small shoulder block portion 13Aa. In the present embodiment, the shoulder sipe 18 is provided in the small shoulder block portion 13Aa inward in the tire lateral direction. Further, the shoulder sipe 18 includes at least one bent portion 18A and at least two sipe portions 18B and 18C. In the present embodiment, the shoulder sipe 18 includes one bent portion 18A and two linear sipe portions 18B and 18C. Further, the one sipe portion 18B mainly extends along the tire circumferential direction (tire equator line CL) and has an angle $\theta 14$ (not shown) with respect to the tire circumferential direction (tire equator line CL) satisfies $0°≤\theta_{14}≤15°$. The angle $\theta_{14}$ is an angle formed with a center line (not shown) passing through the center of the groove width of the one sipe portion 18B. Further, the other sipe portion 18C has an angle $\theta_{15}$ (not shown) with respect to the tire circumferential direction (tire equator line CL), which is larger than the one sipe portion 18B and satisfies $35°≤\theta_{15}≤60°$. The angle $\theta_{15}$ is an angle formed with a center line (not shown) passing through the center of the groove width of the other sipe portion 18C. The shoulder sipe 18 (sipe portions 18B and 18C) is a groove having a groove depth $D_8$ (not shown) satisfying 9 mm$≤D_8≤$17 mm and a groove width $W_{16}$ (not shown) satisfying 0.4 mm$≤W_{16}≤$1.0 mm.

As in the configuration described above, the pneumatic tire 1 according to the present embodiment includes: at least two of the circumferential main grooves 11 being provided and extending continuously along the tire circumferential direction in the tread surface 3, all of the circumferential main grooves 11 being disposed in the inner half of the tread developed width $W_6$ in the tire lateral direction; the shoulder land portions 13 being formed outward of the outermost circumferential main grooves 11 in the tire lateral direction, the outermost circumferential main grooves 11 being on outermost sides in the tire lateral direction; the plurality of shoulder lug grooves 16 being provided to communicate with the outermost circumferential main grooves 11 from the outer edges T of the tread surface 3 in the tire lateral direction, being provided side by side in the tire circumferential direction, dividing the shoulder land portions 13 into the shoulder block portions 13A, and each including the see-through portion 16A in the tire lateral direction; the center land portion 12 being defined by the pair of innermost circumferential main grooves 11 on an innermost side in the tire lateral direction, the pair of innermost circumferential main grooves 11 being adjacent to each other across the tire equator line CL; and the plurality of center lug grooves 14 being provided in the center land portion to communicate with each of the pair of innermost circumferential main grooves 11 12 in the tire lateral direction, being provided side by side in the tire circumferential direction, and dividing the center land portion 12 into the plurality of center block portions 12A. The center lug groove 14 includes: the two end groove portions 14A having ends opening to the pair of innermost circumferential main grooves 11 and the one center groove portion 14B extending between the other ends of the end groove portions 14A at an angle different from the end groove portions 14A, having at least a part disposed on the tire equator line CL, and having the angle $\theta 1$ with respect to the tire equator line CL, which satisfies $-45°\leq\theta_1\leq+15°$.

According to the pneumatic tire 1, the circumferential main grooves 11 all of which are arranged in the inner half of the tread developed width $W_6$ of the tread surface 3 in the tire lateral direction; the shoulder lug grooves 16 that divide the shoulder land portions 13 into the shoulder block portions 13A and that each include the see-through portion 16A; and the center lug grooves 14 that divide the center land portion 12 into the center block portions 12A are included. Thus, due to the drainage performance of the shoulder lug grooves 16 and the center lug grooves 14 and an edge effect exerted by the division of the shoulder block portions 13A and the center block portions 12A, traction performance on wet road surfaces can be improved. Additionally, the center lug groove 14 each includes: the two end groove portions 14A and the one center groove portion 14B on the tire equator line CL between the end groove portions 14A, which has the angle $\theta_1$ with respect to the tire equator line CL satisfying $-45°\leq\theta_1\leq+15°$. With this, the angle of the center block portion 12A is prevented from being acute on the stepping side, and hence block rigidity is secured. Thus, heal-and-toe wear resistance performance can be improved.

Further, in the pneumatic tire 1 according to the present embodiment, the width $W_{13}$ of the see-through portion 16A of the shoulder lug groove 16 in the tire circumferential direction and a pitch length P (see FIG. 2) of the shoulder block portion 13A in the tire circumferential direction, which is defined by the shoulder lug groove 16 including the see-through portion 16A, preferably satisfy a relationship of $0.10\leq W_{13}/P\leq 0.25$. According to the pneumatic tire 1, the interrelation between the see-through portion 16A and the pitch length of the shoulder block portion 13A is optimized. With this, while maintaining heal-and-toe wear resistance performance, traction performance on wet road surfaces can further be improved.

Further, in the pneumatic tire 1 according to the present embodiment, the angle $\theta_{11}$ of the end groove portion 14A with respect to the tire lateral direction preferably satisfies $10°\leq\theta_{11}\leq 20$. According to the pneumatic tire, with the relationship of the angle $\theta_1$ of the center groove portion 14B with respect to the tire equator line CL, the angle of the center block portion 12A is prevented from being acute on the stepping side, and hence block rigidity is secured. Thus, the effect of improving heal-and-toe wear resistance performance can be exerted more remarkably.

Further, in the pneumatic tire 1 according to the present embodiment, the center lug groove 14 preferably includes the connection groove portions 14C that connect the other ends of the end groove portions 14A and the ends of the center groove portion 14B and that are disposed to extend at an angle different from the end groove portions 14A and the center groove portion 14B. According to the pneumatic tire 1, in the center block portion 12A, the parts between each of the other ends of the end groove portions 14A and the ends of the center groove portion 14B are chamfered with the connection groove portions 14C, and hence the rigidity of the center block portion 12A is secured. Thus, heal-and-toe wear resistance performance can be improved.

Further, in the pneumatic tire 1 according to the present embodiment, the connection groove portion 14C preferably has the angle $\theta_{12}$ with respect to the tire circumferential direction (tire equator line CL), which satisfies $40°\leq\theta_{12}\leq 60°$. According to the pneumatic tire, when the angle $\theta_{12}$ of the connection groove portion 14C with respect to the tire circumferential direction (tire equator line CL) is defined, the chamfering angle can be secured by the connection groove portion 14C, and hence the rigidity of the center block portion 12A is secured. Thus, heal-and-toe wear resistance performance can be improved.

Further, in the pneumatic tire 1 according to the present embodiment, a length $L_1$ of the end groove portion 14A (on the center line 14Aa of the end groove portions 14A, a distance between a crossing point $C_1$ with the end of the center block portion 12A and a crossing point $C_2$ with the center line 14Ca of the connection groove portion 14C) and a length $L_2$ of the connection groove portion 14C (on the center line 14Ca of the connection groove portion 14C, a distance between the crossing point $C_2$ with the center line 14Aa of the end groove portion 14A and a crossing point $C_3$ with the center line 14Ba of the center groove portion 14B) preferably satisfy a relationship of $0.2\leq L_2/L_1\leq 0.5$, and a length $L_3$ of the center groove portion 14B (distance between the crossing points $C_3$) and the length $L_2$ of the connection groove portions 14C preferably satisfy a relationship of $0.05\leq L_2/L_3\leq 0.35$. According to the pneumatic tire 1, an edge effect can be exerted while suppressing degradation in block rigidity, and thus heal-and-toe wear resistance performance and traction performance can be achieved in a well-balanced manner.

Further, in the pneumatic tire 1 according to the present embodiment, the maximum groove depth $D_1$ in the tread surface 3, the groove depth $D_2$ of the center groove portion 14B, the groove depth $D_3$ of end groove portion 14A preferably satisfy relationships of $D_1 > D_2 \geq D_3$, $0.5\leq D_2/D_1\leq 0.8$, and $0.2\leq D_3/D_1\leq 0.7$. According to the pneumatic tire 1, the relationships among the groove depths $D_1$, $D_2$, and $D_3$ are defined, and hence the rigidity of the center block portion 12A is secured. Thus, heal-and-toe wear resistance performance can be improved. Note that, in order to secure more rigidity of the center block portion 12A, relationships of $0.6\leq D_2/D_1\leq 0.7$ and $0.4\leq D_3/D_1\leq 0.6$ are preferably satisfied. It is assumed that the groove depths $D_2$ and $D_3$ are the maximum groove depths.

Further, in the pneumatic tire 1 according to the present embodiment, the groove width $W_1$ of the innermost circumferential main groove 11, the groove width $W_2$ of the center groove portion 14B, and the groove width $W_3$ of the end groove portion 14A preferably satisfy relationships of $W_1 > W_2$, $W_1 > W_3$, $0.3\leq W_2/W_1\leq 0.8$, and $0.3\leq W_3/W_1\leq 0.8$. When each of the groove widths $W_2$ and $W_3$ is excessively larger than the groove width $W_1$, the center block portion 12A is reduced in size to degrade rigidity, and thus, the effect of improving heal-and-toe wear resistance performance is reduced. Further, when each of the groove widths $W_2$ and $W_3$ is excessively smaller than the groove width $W_1$, the grooves are closed at the time of contact with the ground, the effect of improving traction performance on wet road surfaces is reduced. Therefore, according to the pneumatic tire 1, each of the groove widths $W_2$ and $W_3$ is optimized with respect to the groove width $W_1$, heal-and-toe wear resistance performance and traction performance on wet road surfaces can be improved. Note that, in order to further optimize each of the groove widths $W_2$ and $W_3$ with respect to the groove width $W_1$, relationships of $0.5 \leq W_2/W_1 \leq 0.7$ and $0.5 \leq W_3/W_1 \leq 0.7$ are preferably satisfied. It is assumed that the groove width $W_1$, the groove width $W_2$, and the groove width $W_3$ are the maximum groove widths.

Further, in the pneumatic tire 1 according to the present embodiment, the center block portion 12A preferably includes the one center sipe 15 that has both ends being terminated and is each formed outward of the tire equator line CL in the tire lateral direction without intersecting the tire equator line CL, and the center sipe 15 preferably includes at least one bent portion 15A. According to the pneumatic tire 1, the center sipe 15 is disposed in the center block portion 12A, and thus a contact pressure in the center block portion 12A is released. Thus, heal-and-toe wear resistance performance can be improved.

Further, in the pneumatic tire 1 according to the present embodiment, the center sipe 15 preferably includes the two sipe portions 15B and 15C having different angles via the one bent portion 15A, and the angle $\theta_2$ of one of the sipe portions 15B with respect to the tire equator line CL preferably satisfies $0° \leq \theta_2 \leq 15°$. According to the pneumatic tire 1, in the center block portion 12A including the center lug groove 14 having the angle $\theta_1$ ($-45° \leq \theta_1 \leq +15°$) of the center groove portion 14B with respect to the tire equator line CL, a contact pressure can be effectively suppressed, and heal-and-toe wear resistance performance can be improved. Note that, in order to suppress a contact pressure effectively in the center block portion 12A including the center lug groove 14, a relationship of $0° \leq \theta_2 \leq 10°$ is preferably satisfied.

Further, in the pneumatic tire 1 according to the present embodiment, the angle $\theta_3$ of the other sipe portion 15C with respect to the tire equator line CL preferably satisfies $35° \leq \theta_3 \leq 60°$. According to the pneumatic tire 1, in the interrelation with the sipe portion 15B having the angle $\theta_2$ with respect to the tire equator line CL satisfying $0° \leq \theta_2 \leq 15°$, heal-and-toe wear resistance performance and traction performance on wet road surfaces can be improved.

Further, in the pneumatic tire 1 according to the present embodiment, the groove depth $D_4$ of the center sipe 15 and the maximum groove depth $D_1$ in the tread surface 3 preferably satisfy a relationship of $0.3 \leq D_4/D_1 \leq 0.9$. According to the pneumatic tire 1, the groove depth $D_4$ of the center sipe 15 is defined with respect to the maximum groove depth $D_1$, a contact pressure in the center block portion 12A can be released effectively, and heal-and-toe wear resistance performance can be improved. Note that, in order to release a contact pressure in the center block portion 12A more effectively, a relationship of $0.5 \leq D_4/D_1 \leq 0.7$ is preferably satisfied. It is assumed that the groove depth $D_4$ is the maximum groove depth.

Further, in the pneumatic tire 1 according to the present embodiment, the shoulder block portion 13A preferably extends in the tire circumferential direction in a shape that allows the shoulder lug grooves 16 adjacent to each other in the tire circumferential direction to communicate with each other and includes the shoulder circumferential narrow groove 17 including the bent portion 17A in the midway, and the groove depth $D_5$ of the shoulder circumferential narrow groove 17 and the maximum groove depth $D_1$ in the tread surface 3 preferably satisfy a relationship of $0.6 \leq D_5/D_1 \leq 0.9$. According to the pneumatic tire 1, the shoulder block portion 13A is provided with the shoulder circumferential narrow groove 17, and thus the shoulder block portion 13A is divided into the small shoulder block portions 13Aa. With this, a contact pressure in the shoulder block portion 13A can be released, and heal-and-toe wear resistance performance can be improved. Additionally, the shoulder circumferential narrow groove 17 includes the bent portion 17A in the midway, and thus the groove length is secured to increase an edge effect in the tire circumferential direction. Thus, traction performance on wet road surfaces can be improved. Note that, in order to release a contact pressure in the shoulder block portion 13A, a relationship of $0.8 \leq D_5/D_1 \leq 0.9$ is preferably satisfied. It is assumed that the groove depth $D_5$ is the maximum groove depth.

Further, in the pneumatic tire 1 according to the present embodiment, the shoulder circumferential narrow groove 17 preferably has the groove width $W_4$ satisfying $1 \text{ mm} \leq W_4 \leq 5 \text{ mm}$. According to the pneumatic tire 1, the groove width $W_4$ of the shoulder circumferential narrow groove 17 is defined, and hence the small shoulder block portions 13Aa are mutually supported at the time of contact with the ground to secure block rigidity. Thus, heal-and-toe wear resistance performance can be improved.

Further, in the pneumatic tire 1 according to the present embodiment, the groove width $W_5$ of the shoulder lug groove 16 and the tread developed width $W_6$ preferably satisfy a relationship of $0.03 \leq W_5/W_6 \leq 0.20$. According to the pneumatic tire 1, when $0.03 \leq W_5/W_6$ is satisfied, the shoulder lug grooves 16 are prevented from being closed at the time of contact with the ground. Thus, drainage performance can be secured, and traction performance on wet road surfaces can be improved. Meanwhile, when $W_5/W_6 \leq 0.20$ is satisfied, the size reduction of the shoulder block portion 13A is suppressed. Thus, block rigidity can be secured, and heal-and-toe wear resistance performance can be improved. It is assumed that the groove width $W_5$ is the maximum groove width.

Further, in the pneumatic tire 1 according to the present embodiment, the shoulder lug groove 16 preferably includes the raised bottom portion 16B on the groove bottom, and the groove depth $D_6$ of the raised bottom portion 16B and the maximum groove depth $D_1$ in the tread surface 3 preferably satisfy a relationship of $0.5 \leq D_6/D_1 \leq 0.9$. According to the pneumatic tire 1, with the raised bottom portion 16B, the block rigidity of the shoulder block portion 13A can be secured, and heal-and-toe wear resistance performance can be improved. Note that, in order to secure more block rigidity, a relationship of $0.8 \leq D_6/D_1 \leq 0.9$ is preferably satisfied. It is assumed that the groove depth $D_6$ is the minimum groove depth.

Further, in the pneumatic tire 1 according to the present embodiment, the groove width $W_1$ of the innermost circumferential main groove 11 and the tread developed width $W_6$ preferably satisfy a relationship of $0.01 \leq W_1/W_6 \leq 0.07$. According to the pneumatic tire 1, when $0.01 \leq W_1/W_6$ is satisfied, the groove width $W_1$ of the innermost circumferential main groove 11 is secured. Thus, drainage performance can be secured, and traction performance on wet road surfaces can be improved. Meanwhile, when $W_1/W_6 \leq 0.07$ is satisfied, the size reduction of the center block portion 12A is suppressed. Thus, block rigidity can be secured, and heal-and-toe wear resistance performance can be improved. It is assumed that the groove width $W_1$ is the maximum groove width.

Further, in the pneumatic tire 1 according to the present embodiment, each of the innermost circumferential main grooves 11 preferably includes the bent portion 11A, and a maximum width $W_8$ and a minimum width $W_9$ of the center block portion 12A in the tire lateral direction preferably satisfy a relationship of $0.5 \leq W_9/W_8 \leq 0.7$. According to the pneumatic tire 1, when $0.5 \leq W_9/W_8$ is satisfied, the size reduction of the center block portion 12A is suppressed. Thus, block rigidity can be secured, and heal-and-toe wear resistance performance can be improved. Meanwhile, when $W_9/W_8 \leq 0.7$ is satisfied, the width of the bent portion 11A of each of the innermost circumferential main grooves 11 is secured. Thus, traction performance on wet road surfaces can be improved.

Further, in the pneumatic tire 1 according to the present embodiment, in the tread portion 2 forming the tread surface 3, a pair of the cross belts 72 and 73 that are wound in the tire circumferential direction and that include the cords intersecting each other are preferably provided, and a narrow belt width $W_{10}$ of the cross belt 73 among the cross belts 72 and 73 in the tire lateral direction and the maximum width $W_5$ of the center block portion 12A in the tire lateral direction preferably satisfy a relationship of $0.2 \leq W_8/W_{10} \leq 0.6$. According to the pneumatic tire 1, the maximum width $W_5$ of the center block portion 12A is defined with respect to the narrow belt width $W_{10}$ of the cross belt 73. With this, the block rigidity of the center block portion 12A can be improved, and heal-and-toe wear resistance performance can be improved.

Further, in the pneumatic tire 1 according to the present embodiment, in the pneumatic tire 1 according to the present embodiment, in the tread portion 2 forming the tread surface 3, the pair of cross belts 72 and 73 that are wound in the tire circumferential direction and that include the cords intersecting each other are preferably provided, and a wide belt width $W_{14}$ of the cross belt 72 among the cross belts 72 and 73 in the tire lateral direction and the maximum width $W_5$ of the center block portion 12A preferably satisfy a relationship of $0.2 \leq W_5/W_{14} \leq 0.4$. According to the pneumatic tire 1, the maximum width $W_5$ of the center block portion 12A is defined with respect to the wide belt width $W_{14}$ of the cross belt 72. With this, the block rigidity of the center block portion 12A can be improved, and heal-and-toe wear resistance performance can be improved.

Examples

In the examples, performance tests for heal-and-toe wear resistance performance and traction performance on wet road surfaces were performed on a plurality of types of pneumatic tires of different conditions (see FIGS. 5A to 8C).

In the performance tests, a pneumatic tire (heavy duty pneumatic tire) having a tire size of 11R 22.5 was mounted to a specified rim, inflated to a specified air pressure, and mounted to a drive shaft of a test vehicle (2-DD, a tractor head).

Evaluation on heal-and-toe wear resistance performance was performed by measuring a heal-and-toe wear amount of block portions of a land portion after the test vehicle traveled on dry asphalt road surfaces for 50000 km. Further, based on the measurement results, index evaluation was carried out with Conventional Example being defined as the reference (100). In this index evaluation, larger values indicate a less heal-and-toe wear amount and superior heal-and-toe wear resistance performance.

Evaluation on traction performance on wet road surfaces was performed by measuring acceleration from a speed of 5 km/h to a speed of 20 km/h while the test vehicle traveled on asphalt road surfaces on which water was spread at a water depth of 1 mm. Further, based on the measurement results, index evaluation was carried out with Conventional Example being defined as the reference (100). Larger index values indicate higher acceleration and superior traction performance on wet road surfaces.

In Conventional Example, two circumferential main grooves were disposed in an inner half of a tread developed width in the tire lateral direction, a center land portion formed by the circumferential main grooves was divided by center lug grooves into center block portions, and each center lug groove included a center groove portion. However, the angle $\theta_1$ of the center groove portion was +45°, which did not fall within the specified range. In Comparative Example 1, two circumferential main grooves were disposed in an outer half of a tread developed width in the tire lateral direction, and center lug grooves were not provided in a center land portion formed by the circumferential main grooves. In Comparative Example 2, two circumferential main grooves were disposed in an inner half of a tread developed width in the tire lateral direction, a center land portion formed by the circumferential main grooves was divided by center lug grooves into center block portions. However, each center lug groove was linear and did not include a center groove portion. In contrast, in each of Examples, two circumferential main grooves were disposed in an inner half of a tread developed width in the tire lateral direction, a center land portion formed by the circumferential main grooves was divided by center lug grooves into center block portions, and each center lug groove included a center groove portion. Further, the angle θ1 of the center groove portion fell within the specified range (all the angles were on the plus side).

As shown in the test results in FIGS. 5A to 8C, it can be understood that the pneumatic tire in each Example improved heal-and-toe wear resistance performance and traction performance on wet road surfaces.

The invention claimed is:

1. A pneumatic tire, comprising:
at least two circumferential main grooves being provided and extending continuously along a tire circumferential direction in a tread surface, all of the circumferential main grooves being disposed in an inner half of a tread developed width in a tire lateral direction, the circumferential main grooves having a groove width of greater than or equal to 6 mm;
shoulder land portions being formed outward of outermost circumferential main grooves in the tire lateral direction, the outermost circumferential main grooves being on outermost sides in the tire lateral direction;
a plurality of shoulder lug grooves being provided to communicate with the outermost circumferential main grooves from outer edges of the tread surface in the tire lateral direction, being provided side by side in the tire circumferential direction, dividing the shoulder land portions into shoulder block portions, and each including a see-through portion in the tire lateral direction, the see-through portion being formed such that, when viewed in a direction parallel to the tire lateral direction from an outer edge in the tire lateral direction or when viewed in the direction parallel to the tire lateral direction from one of the outermost circumferential main grooves, the one of the outermost circumferential main grooves or the outer edge in the tire lateral direction that is positioned on an opposite side from a viewing side can be seen through the see-through portion without interference of a groove wall;

a center land portion being defined by a pair of innermost circumferential main grooves on an innermost side in the tire lateral direction, the pair of innermost circumferential main grooves being adjacent to each other across a tire equator line; and a plurality of center lug grooves being provided in the center land portion to communicate with each of the pair of innermost circumferential main grooves in the tire lateral direction, being provided side by side in the tire circumferential direction, and dividing the center land portion into a plurality of center block portions, the plurality of center lug grooves each including:

two end groove portions having ends opening to the pair of innermost circumferential main grooves; and one center groove portion extending between other ends of the end groove portions at an angle different from the end groove portions, having at least a part disposed on the tire equator line, and having an angle $\theta_1$ with respect to the tire equator line, which satisfies $-45° \leq \theta_1 \leq +15°$; wherein the shoulder lug grooves each include only a single raised bottom portion on a groove bottom, the raised bottom portion being positioned closer to a tread edge than to the outermost circumferential main grooves, a groove depth $D_6$ of each of the raised bottom portions and the maximum groove depth $D_1$ in the tread surface satisfy a relationship of $0.75 \leq D_6/D_1 \leq 0.9$, and a maximum groove depth $D_1$ in the tread surface, a groove depth $D_2$ of the center groove portion, and a groove depth $D_3$ of the end groove portions satisfy relationships of $D_1 > D_2 \geq D_3$, $0.5 \leq D_2/D_1 \leq 0.8$, and $0.2 \leq D_3/D_1 \leq 0.7$.

2. The pneumatic tire according to claim 1, wherein the center lug grooves each include connection groove portions that connect the other ends of the end groove portions and ends of the center groove portion and are disposed to extend at an angle different from the end groove portions and the center groove portion.

3. The pneumatic tire according to claim 1, wherein a groove width $W_1$ of the innermost circumferential main grooves, a groove width $W_2$ of the center groove portion, and a groove width $W_3$ of the end groove portions satisfy a relationship of $W_1 > W_2$, $W_1 > W_3$, $0.3 \leq W_2/W_1 \leq 0.8$, and $0.3 \leq W_3/W_1 \leq 0.8$.

4. The pneumatic tire according to claim 1, wherein the center block portions each include one center sipe that has both ends being terminated, the one center sipe of each of the center block portions being formed outward of the tire equator line in the tire lateral direction without intersecting the tire equator line, and the center sipe includes at least one bent portion.

5. The pneumatic tire according to claim 4, wherein the center sipes each include two sipe portions having different angles via the one bent portion, and an angle $\theta_2$ of one of the sipe portions with respect to the tire equator line satisfies $0° \leq \theta_2 \leq 15°$.

6. The pneumatic tire according to claim 4, wherein a groove depth $D_4$ of the center sipes and the maximum groove depth $D_1$ in the tread surface satisfy a relationship of $0.3 \leq D_4/D_1 \leq 0.9$.

7. The pneumatic tire according to claim 1, wherein the shoulder block portions extend in the tire circumferential direction in a shape that allows the shoulder lug grooves adjacent to each other in the tire circumferential direction to communicate with each other and each of the shoulder block portions includes a shoulder circumferential narrow groove including a bent portion in a midway, and a groove depth $D_5$ of the shoulder circumferential narrow grooves and the maximum groove depth $D_1$ in the tread surface satisfy a relationship of $0.6 \leq D_5/D_1 \leq 0.9$.

8. The pneumatic tire according to claim 7, wherein the shoulder circumferential narrow grooves each have a groove width $W_4$ satisfying $1$ mm $\leq W_4 \leq 5$ mm.

9. The pneumatic tire according to claim 1, wherein a groove width $W_5$ of the shoulder lug grooves and the tread developed width $W_6$ satisfy a relationship of $0.03 \leq W_5/W_6 \leq 0.20$.

10. The pneumatic tire according to claim 1, wherein the groove width $W_1$ of the innermost circumferential main grooves and the tread developed width $W_6$ satisfy a relationship of $0.01 \leq W_1/W_6 \leq 0.07$.

11. The pneumatic tire according to claim 1, wherein the innermost circumferential main grooves each include a bent portion, and a largest width $W_8$ and a smallest width $W_9$ of the center block portions in the tire lateral direction satisfy a relationship of $0.5 \leq W_9/W_8 \leq 0.7$, the largest width $W_8$ being defined as a distance in the tire lateral direction between the axially outermost point of the center block portions on one side of the tire equator line to the axially outermost point of the center block portions on an other side of the tire equator line, and the smallest width $W_9$ being defined as a distance in the tire lateral direction between the axially innermost point of the center block portions on the one side of the tire equator line to the axially innermost point of the center block portions on the other side of the tire equator line where opening positions of the center lug grooves to the innermost circumferential main grooves on the one side and the other side of the tire equator line are defined as the axially innermost points on the one side and the other side of the tire equator line of the center block portions.

12. The pneumatic tire according to claim 1, wherein in a tread portion forming the tread surface, a pair of cross belts that are wound in the tire circumferential direction and that include cords intersecting each other are provided, and a narrow belt width $W_{10}$ of the cross belts in the tire lateral direction and a maximum width $W_8$ of the center block portions in the tire lateral direction satisfy a relationship of $0.2 \leq W_8/W_{10} \leq 0.6$.

13. A pneumatic tire, comprising:

at least two circumferential main grooves being provided and extending continuously along a tire circumferential direction in a tread surface, all of the circumferential main grooves being disposed in an inner half of a tread developed width in a tire lateral direction, the circumferential main grooves having a groove width of greater than or equal to 6 mm;

shoulder land portions being formed outward of outermost circumferential main grooves in the tire lateral direction, the outermost circumferential main grooves being on outermost sides in the tire lateral direction;

a plurality of shoulder lug grooves being provided to communicate with the outermost circumferential main grooves from outer edges of the tread surface in the tire lateral direction, being provided side by side in the tire circumferential direction, dividing the shoulder land portions into shoulder block portions, and each including a see-through portion in the tire lateral direction, the see-through portion being formed such that, when viewed in a direction parallel to the tire lateral direction from an outer edge in the tire lateral direction or when viewed in the direction parallel to the tire lateral direction from one of the outermost circumferential main grooves, the one of the outermost circumferential main grooves or the outer edge in the tire lateral direction that is positioned on an opposite side from a viewing side can be seen through the see-through portion without interference of a groove wall;

a center land portion being defined by a pair of innermost circumferential main grooves on an innermost side in the tire lateral direction, the pair of innermost circumferential main grooves being adjacent to each other across a tire equator line; and a plurality of center lug grooves being provided in the center land portion to communicate with each of the pair of innermost circumferential main grooves in the tire lateral direction, being provided side by side in the tire circumferential direction, and dividing the center land portion into a plurality of center block portions, the plurality of center lug grooves each including:

two end groove portions having ends opening to the pair of innermost circumferential main grooves; and one center groove portion extending between other ends of the end groove portions at an angle different from the end groove portions, having at least a part disposed on the tire equator line, and having an angle $\theta_1$ with respect to the tire equator line, which satisfies $-45° \leq \theta_1 \leq +15°$; wherein a maximum groove depth $D_1$ in the tread surface, a groove depth $D_2$ of the center groove portion, and a groove depth $D_3$ of the end groove portions satisfy relationships of $D_1 > D_2 \geq D_3$, $0.5 \leq D_2/D_1 \leq 0.8$, and $0.2 \leq D_3/D_1 \leq 0.7$, the center block portions each include one center sipe that has both ends being terminated, the one center sipe of each of the center block portions being formed outward of the tire equator line in the tire lateral direction without intersecting the tire equator line, and the center sipe includes at least one bent portion.

14. A pneumatic tire, comprising:

at least two circumferential main grooves being provided and extending continuously along a tire circumferential direction in a tread surface, all of the circumferential main grooves being disposed in an inner half of a tread developed width in a tire lateral direction, the circumferential main grooves having a groove width of greater than or equal to 6 mm;

shoulder land portions being formed outward of outermost circumferential main grooves in the tire lateral direction, the outermost circumferential main grooves being on outermost sides in the tire lateral direction;

a plurality of shoulder lug grooves being provided to communicate with the outermost circumferential main grooves from outer edges of the tread surface in the tire lateral direction, being provided side by side in the tire circumferential direction, dividing the shoulder land portions into shoulder block portions, and each including a see-through portion in the tire lateral direction, the see-through portion being formed such that, when viewed in a direction parallel to the tire lateral direction from an outer edge in the tire lateral direction or when viewed in the direction parallel to the tire lateral direction from one of the outermost circumferential main grooves, the one of the outermost circumferential main grooves or the outer edge in the tire lateral direction that is positioned on an opposite side from a viewing side can be seen through the see-through portion without interference of a groove wall;

a center land portion being defined by a pair of innermost circumferential main grooves on an innermost side in the tire lateral direction, the pair of innermost circumferential main grooves being adjacent to each other across a tire equator line; and a plurality of center lug grooves being provided in the center land portion to communicate with each of the pair of innermost circumferential main grooves in the tire lateral direction, being provided side by side in the tire circumferential direction, and dividing the center land portion into a plurality of center block portions, the plurality of center lug grooves each including:

two end groove portions having ends opening to the pair of innermost circumferential main grooves; and one center groove portion extending between other ends of the end groove portions at an angle different from the end groove portions, having at least a part disposed on the tire equator line, and having an angle $\theta_1$ with respect to the tire equator line, which satisfies $-45° \leq \theta_1 \leq +15°$, wherein a groove width $W_1$ of the innermost circumferential main grooves, a groove width $W_2$ of the center groove portion, and a groove width $W_3$ of the end groove portions satisfy a relationship of $W_1 > W_2$, $W_1 > W_3$, $0.3 \leq W_2/W_1 \leq 0.8$, and $0.3 \leq W_3/W_1 \leq 0.8$, the center block portions each include one center sipe that has both ends being terminated, the one center sipe of each of the center block portions being formed outward of the tire equator line in the tire lateral direction without intersecting the tire equator line, and the center sipe includes at least one bent portion.

15. A pneumatic tire, comprising:

at least two circumferential main grooves being provided and extending continuously along a tire circumferential direction in a tread surface, all of the circumferential main grooves being disposed in an inner half of a tread developed width in a tire lateral direction, the circumferential main grooves having a groove width of greater than or equal to 6 mm;

shoulder land portions being formed outward of outermost circumferential main grooves in the tire lateral direction, the outermost circumferential main grooves being on outermost sides in the tire lateral direction;

a plurality of shoulder lug grooves being provided to communicate with the outermost circumferential main grooves from outer edges of the tread surface in the tire lateral direction, being provided side by side in the tire circumferential direction, dividing the shoulder land portions into shoulder block portions, and each including a see-through portion in the tire lateral direction, the see-through portion being formed such that, when viewed in a direction parallel to the tire lateral direction from an outer edge in the tire lateral direction or when viewed in the direction parallel to the tire lateral direction from one of the outermost circumferential main grooves, the one of the outermost circumferential main grooves or the outer edge in the tire lateral direction that is positioned on an opposite side from a viewing side can be seen through the see-through portion without interference of a groove wall;

a center land portion being defined by a pair of innermost circumferential main grooves on an innermost side in the tire lateral direction, the pair of innermost circumferential main grooves being adjacent to each other across a tire equator line; and a plurality of center lug grooves being provided in the center land portion to communicate with each of the pair of innermost circumferential main grooves in the tire lateral direction, being provided side by side in the tire circumferential direction, and dividing the center land portion into a plurality of center block portions, the plurality of center lug grooves each including:

two end groove portions having ends opening to the pair of innermost circumferential main grooves; and one center groove portion extending between other ends of the end groove portions at an angle different from the end groove portions, having at least a part disposed on the tire equator line, and having an angle $\theta_1$ with respect to the tire equator line, which satisfies $-45° \leq \theta_1 \leq +15°$; wherein the shoulder lug grooves each include only a single raised bottom portion on a groove bottom, the raised bottom portion being positioned closer to a tread edge than to the outermost circumferential main grooves, a groove depth De of each of the raised bottom portions and the maximum groove depth $D_1$ in the tread surface satisfy a relationship of $0.75 \leq D_6/D_1 \leq 0.9$, and a groove width $W_1$ of the innermost circumferential main grooves, a groove width $W_2$ of the center groove portion, and a groove width $W_3$ of the end groove portions satisfy a relationship of $W_1 > W_2$, $W_1 > W_3$, $0.3 \leq W_2/W_1 \leq 0.8$, and $0.3 \leq W_3/W_1 \leq 0.8$.

* * * * *